United States Patent [19]
Mukai et al.

[11] Patent Number: 5,194,886
[45] Date of Patent: Mar. 16, 1993

[54] FINDER OPTICAL SYSTEM

[75] Inventors: Hiromu Mukai, Kawachinagano; Kohtaro Hayashi, Hirakata; Ichiro Kasai, Sakai; Jun Ishihara, Sakai; Yasumasa Sugihara, Sakai, all of Japan

[73] Assignee: Minolta Camera Kabushiki Kaisha, Osaka, Japan

[21] Appl. No.: 679,562

[22] Filed: Apr. 2, 1991

[30] Foreign Application Priority Data

| Apr. 3, 1990 [JP] | Japan | 2-89711 |
| Apr. 4, 1990 [JP] | Japan | 2-89816 |
| Apr. 5, 1990 [JP] | Japan | 2-90623 |

[51] Int. Cl.$^5$ .................................. G03B 13/10
[52] U.S. Cl. .............................. 354/222; 359/643
[58] Field of Search ............ 354/195.12, 222; 359/675–677, 643–645

[56] References Cited

U.S. PATENT DOCUMENTS

| 3,438,689 | 4/1969 | Wehr | 354/222 |
| 4,652,104 | 3/1987 | Harvey | 354/222 |
| 4,909,614 | 3/1990 | Itoh et al. | 354/222 |
| 4,955,715 | 9/1990 | Kitagishi | 354/222 |
| 4,964,686 | 10/1990 | Kato | 354/222 |
| 5,014,078 | 5/1991 | Kudo et al. | 354/222 |
| 5,055,868 | 10/1991 | Itoh et al. | 354/222 |

FOREIGN PATENT DOCUMENTS 1309033 12/1989 Japan.

Primary Examiner—Michael L. Gellner
Assistant Examiner—David M. Gray
Attorney, Agent, or Firm—Price, Gess & Ubell

[57] ABSTRACT

In a finder optical system provided separately from a taking lens system, an objective lens system forms a primary image which is an inverted image of a subject, a relay lens system erects the primary image formed by the objective lens system to form a secondary image which is an erecting image and can change the size of the secondary image, and an ocular enlarges the secondary image formed by the relay lens system and can change the enlargement ratio.

The finder optical system is useful for a camera constituting the trimming system.

17 Claims, 23 Drawing Sheets

FINDER OPTICAL SYSTEM

BACKGROUND OF THE INVENTION

1. Field of the Invention

The present invention relates to a finder optical system employed in a camera. More particularly, the present invention relates to a finder optical system useful for a camera which constitutes a trimming system.

2. Prior Arts

In the trimming system, an information specifying an area A including the center of an image formation area B on a film 50 shown in FIG. 1a is memorized onto a predetermined portion 51 on the emulsion surface of the film 50. The area can be enlarged to be printed in the area A' on photographic paper 52 shown in FIG. 1b by using the information memorized onto the portion 51. To be more specific, at a trimming mode photographing, the trimming information is taken onto the predetermined portion 51 of a film in the form of a code signal by a code taking unit; the information is detected and read by a reader unit in printing. The area A is magnified by a zooming operation of an optical system of a printer according to the information. As shown in FIG. 1c, in order to take the trimming information onto the film 50, light emitting diodes LED1, LED2, and LED3 are provided which are controlled by the code signal. The light emitted by the diodes LED1 to LED3 is led to the predetermined portion 51 of the film 50 through optical fibers 53, 54, and 55 and the predetermined portion 51 is exposed by the light.

For a camera to which such trimming system is applicable, a finder by which the trimming area (the area A) is seen in an adequate large size at a trimming photographing mode is more convenient than a finder by which the trimming area is seen in small size. It is therefore desirable to fulfill a field frame of the finder with an image corresponding to the trimming area without changing the size of the field frame actually seen in the finder window.

It is hereinafter referred to as "pseudo zooming" to enlarge a trimming area to the predetermined size of the field frame of a finder. On the other hand, when a taking lens system has a zooming function, a finder optical system has to perform a zooming operation in response to the zooming operation of the taking lens system. This zooming operation of a finder optical system is hereinafter referred to as "optical zooming". Many of conventional finder optical systems perform only the optical zooming operation with an objective lens system.

In a real-image-type finder optical system, an image formed by an objective lens system is inverted upside down and rightside left, and therefore if it is viewed only through the object lens system and an ocular, it will seen as the inverted image. Therefore, image erecting system are usually provided between the objective lens system and the ocular. As the image erecting system, a Porro prism has been used in conventional finder optical systems.

When the above-described optical zooming operation and pseudo zooming operation are performed in a finder optical system, the total magnification of the two kinds of zooming operation increases (e.g. when the magnification of an optical zooming is 3× and that of a pseudo zooming is 2×, the total magnification is 6×). Therefore, when the optical and pseudo zooming operation is performed only by an objective lens system, the total length of the finder optical system becomes longer, which makes it impossible to realize a compact camera body. That is, since a finder magnification V is expressed by the following equation:

$$V = f_1/f_2,$$

where $f_1$ is a focal length of an objective lens system and $f_2$ is a focal length of an ocular, in order to increase the magnification V, the focal length $f_1$ of an objective lens system is increased. However, this also increases an axial length (length along the optical axis) of the objective lens system, which naturally increases the total length of the finder optical system.

The magnification V is increased also by decreasing the focal length $f_2$ of the ocular. To decrease $f_2$, the ocular must be arranged close to the image plane where the image is formed by the objective lens system. However, in a conventional finder optical system where the Porro prism is employed, the focal length $f_2$ of the ocular cannot be decreased so much since the ocular touches the Porro prism.

A finder optical system in which a relay lens system is used for erecting the inverted image is also known. However, with respect to a finder optical system employing a relay lens system, it has not been fully examined which optical system should perform a pseudo zooming operation and which optical system should perform an optical zooming operation.

SUMMARY OF THE INVENTION

An object of the present invention is to provide a finder optical system including a relay lens having an image erecting function, in which a pseudo zooming operation and an optical zooming operation are allotted respectively to particular optical systems based on the adequate examination and confirmation.

BRIEF DESCRIPTION OF THE DRAWINGS

These and other objects and features of this invention will become clear from the following description taken in conjunction with the preferred embodiments with reference to the accompanied drawings in which.

DETAILED DESCRIPTION OF THE PREFERRED EMBODIMENTS

Figure 2:
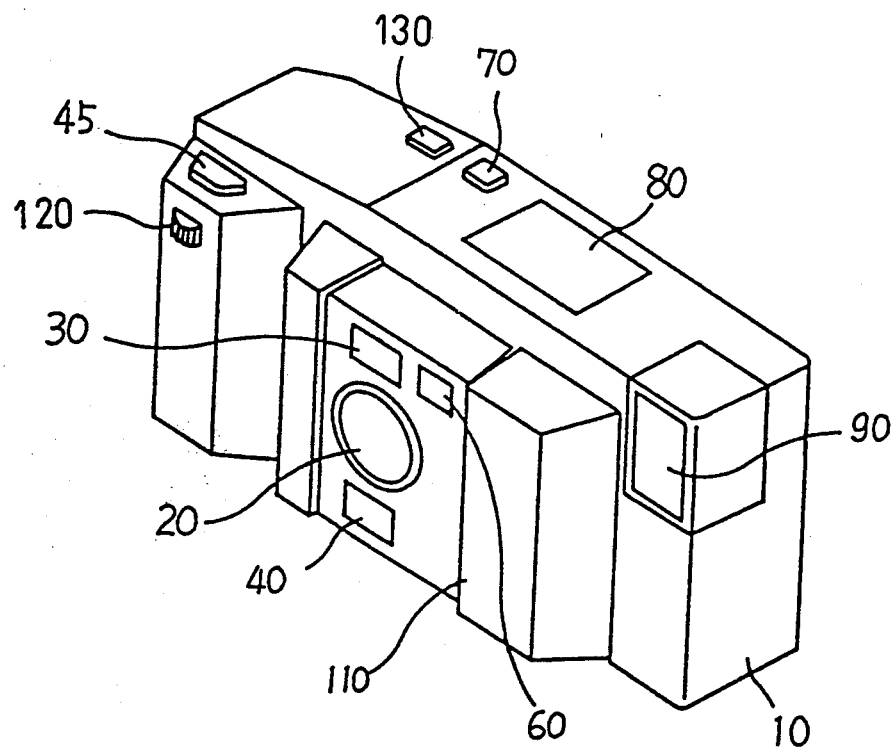
FIG. 2 is a perspective view showing the appearance of a camera in which the present invention is employed.

FIG. 2 is a perspective view of a lens shutter camera which measures a subject distance with light other than the light having passed through a taking lens system. On the front surface of a camera body 10 are provided a taking lens system 20, a light projecting window 30 for automatic focusing (hereinafter referred to as AF), a light receiving window 40 for AF, a front window 60 for a finder, a flash light emitter 90, and a lens protecting cover 110. The lens protecting cover 110 is slidably opened and closed with respect to the taking lens system 20, etc. for protecting them. On the upper surface of the camera body 10 are provided a release button 45, a self timer setting button 70, and an information display panel 80. The information display panel 80 shows the information which is necessary for a photographing such as the focal length, the film frame number of each exposure, etc.

To measure a subject distance, an infrared beam is irradiated through the light projecting window 30 for AF to the subject. The infrared beam is reflected by the subject and enters into the inside of the camera body 10 through the light receiving window 40 and received by a photo-sensor (not shown) arranged in the camera body 10. The measurement is performed with the received light. That is, a subject distance is measured with an angle made by a projected light flux and a received light flux when there is a light spot of the infrared beam irradiated through the light projecting window 30 for AF on the subject.

To perform a pseudo zooming operation, a pseudo zooming setting button 130 is pushed; to perform an optical zooming operation, a zoom lever 120 is operated.

Figure 3:
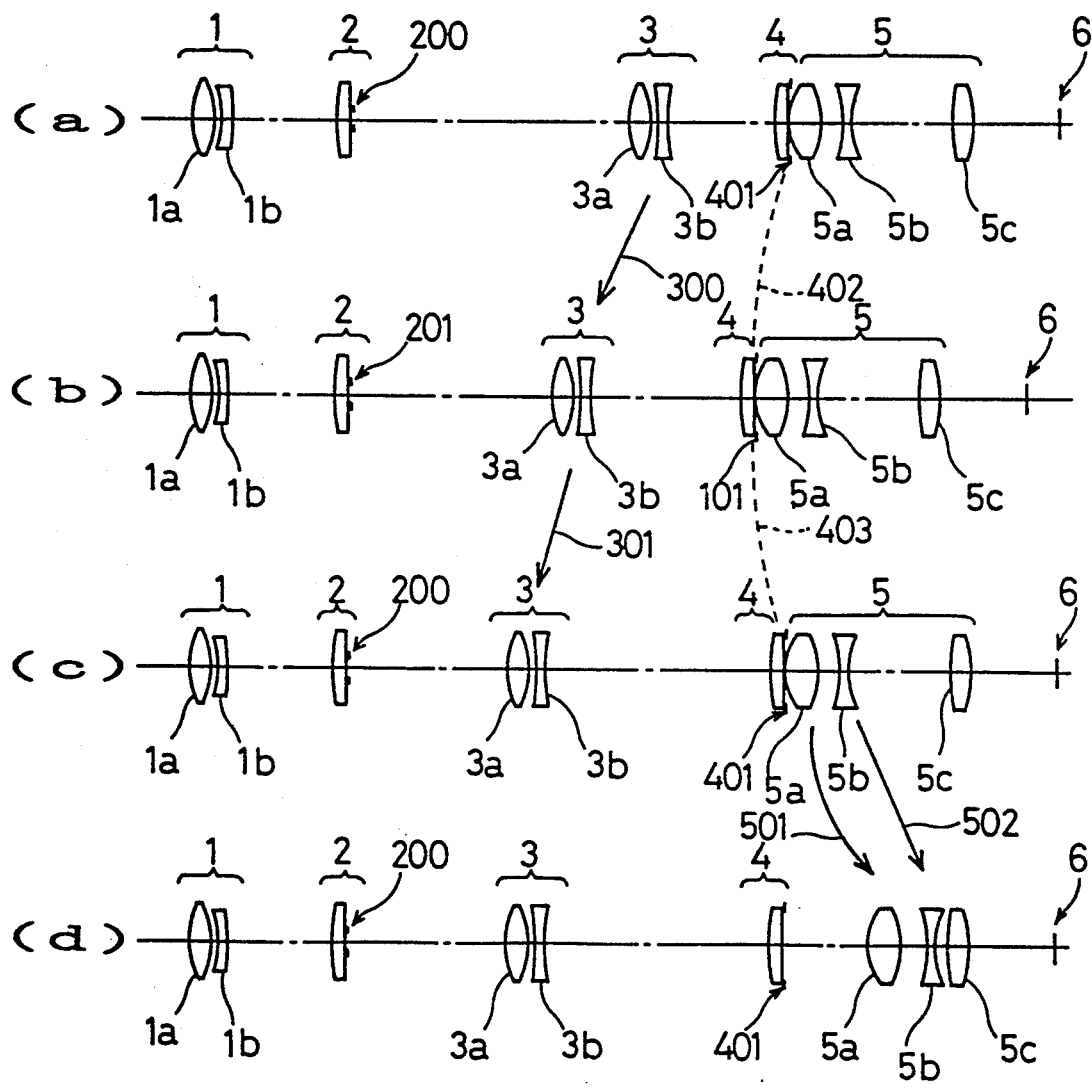
FIG. 3 is a cross sectional view of an embodiment of the present invention.

Embodiments of the present invention will hereinafter be described with reference to the drawings. In FIG. 3 showing an embodiment of the present invention, a finder optical system comprises, from the object side, an objective lens system 1, a first condenser lens 2, a relay lens system 3, a second condenser lens 4, and an ocular 5.

The objective lens system 1, which is stationary, has a positive lens element 1a and a negative lens element 1b. The objective lens system 1 forms a primary image (an inverted real image) on the pupil 6 side of the first condenser lens 2. A subject distance measuring frame 200 is provided on the image plane of the primary image (the primary image plane). As optical means to erect the primary image, the relay lens system 3 is used. The relay lens system 3, which has a positive lens element 3a and a negative lens element 3b, moves along with an optical axis at an optical zooming operation. The relay lens system 3 forms a secondary image (an erecting real image) on the pupil 6 side of the second condenser lens 4. On the image plane of the secondary image (the secondary image plane) is provided a field frame 401. The secondary image is viewed by the pupil 6 through the osular 5. The ocular 5 has a first lens element 5a and a second lens element 5b which move at a pseudo zooming operation and a third lens element 5c which is stationary.

When, in a camera, a taking lens system 20 (see FIG. 3) is zoomed from the shortest focal length condition to the longest focal length condition, a driving force of the zooming is mechanically transmitted to the finder optical system in synchronization with the zooming to move the relay lens system 3 along arrows 300 and 301 from the position shown in (a) to the position shown (c) through the position (b) in FIG. 3. According to the movement, the total length of the relay lens system 3 changes. That is, since the secondary image plane also moves, the second condenser lens 4, the field frame 401, the ocular 5 and the pupil 6 simultaneously move along the dotted lines 402 and 403 as the secondary image plane moves. The zooming operation by the relay lens system 3 realizes the optical zooming operation. A further zooming operation cannot be attained by the relay lens system 3. Therefore, a pseudo zooming operation is performed by moving the first and the second lens elements 5a and 5b of the ocular 5, at the above-mentioned shortest focal length condition, along the arrows 501 and 502 from the position shown in (c) to the position shown in (d) in FIG. 3. In such an operation, the finder magnification is larger in the order of (a)→(b)→(c)→(d) in FIG. 3. The subject distance measuring frame 200, which is provided on the primary image plane behind the objective lens system 1, is correctly displayed in a camera having a function to measure a subject distance with light other than the light having passed through a taking lens system. The size of the field frame 401, which is provided on the secondary image plane, does not change at the optical zooming operation; however, it increases at a pseudo zooming operation. In this case, a trimming area A is displayed by a variable field frame to be described later.

In the embodiment shown in FIG. 3, the relay lens system 3 performs an optical zooming operation, and the ocular 5 performs a pseudo zooming operation. It is also possible that the relay lens system performs a pseudo zooming operation and the ocular 5 performs an optical zooming operation.

Figure 4:
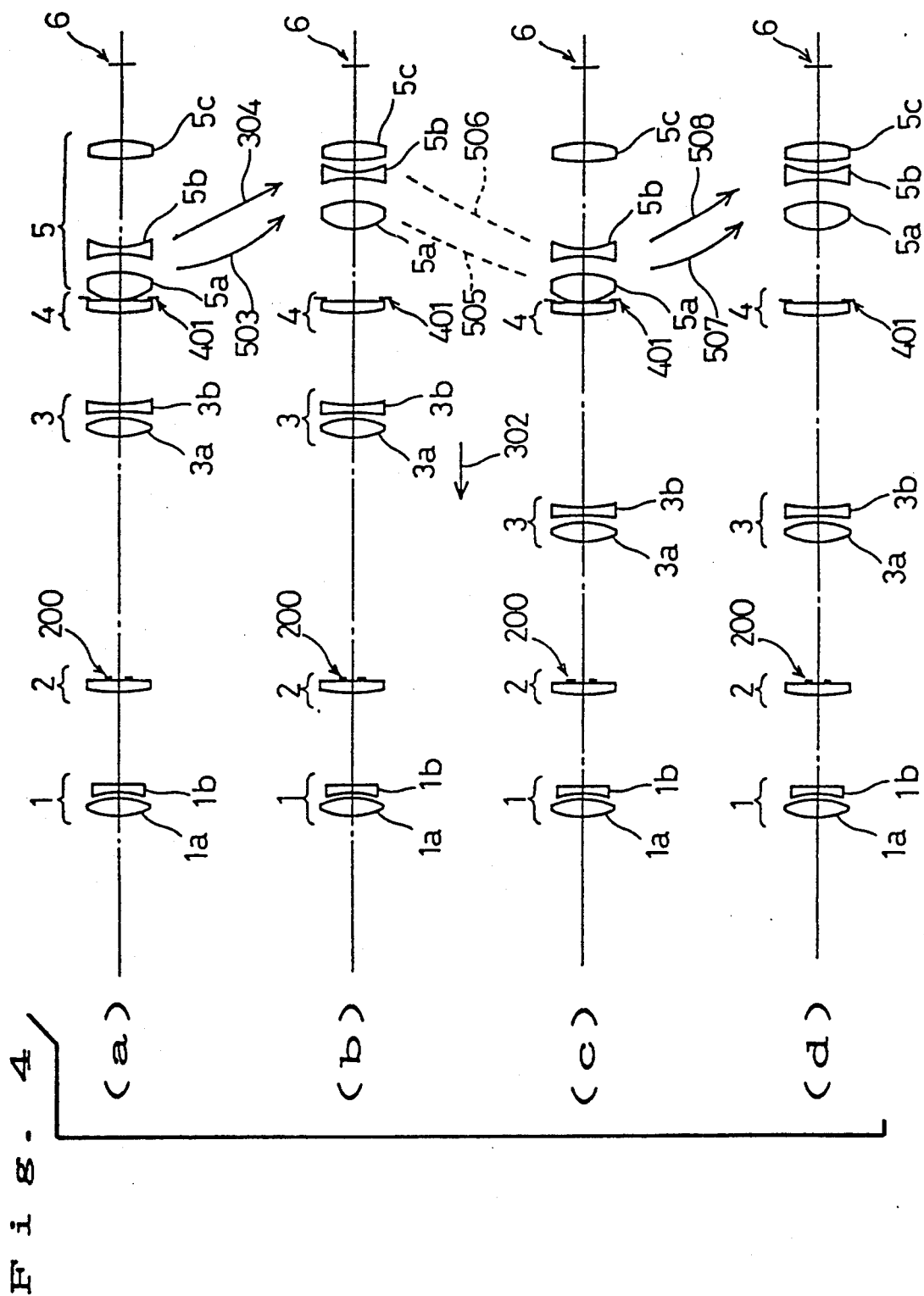
FIG. 4 is a cross sectional view of another embodiment of the present invention.

The optical finder system of an embodiment shown in FIG. 4, has a lens arrangement the same as that of the embodiment shown in FIG. 3. However, some lenses move differently from the lenses of the embodiment in FIG. 3 in a zooming operation. In an optical zooming operation and in a pseudo zooming operation, the relay lens system 3 does not move; only the ocular 5 moves. When the zooming operation is switched from an optical zooming operation to a pseudo zooming operation, the relay lens system 3 moves along the optical axis to a predetermined position where the relay lens system 3 does not change the positions, along the optical axis, of the primary and the secondary images. Due to such positional change of the relay lens system, a secondary image of a different magnification is formed at a position which is the same as the position where the secondary image is formed before the relay lens system moves (i.e. the position where the field frame 401 is provided).

In this embodiment, when a taking lens system of a camera is zoomed from the shortest focal length condition to the longest focal length condition, only the first and the second lens elements 5a and 5b of the ocular 5 move along the arrows 503 and 504 at an optical zooming operation. The above-described optical zooming is achieved by the zooming due to a movement of the first and the second lens elements 5a and 5b. In this embodiment, since the zooming operation by the ocular 5 corresponds to the optical zooming operation, a further zooming cannot be performed by the ocular 5. Therefore, to perform a pseudo zooming operation, firstly, at the above-mentioned longest focal length condition, the relay lens system 3 is moved from the position shown in (b) to the predetermined position shown in (c) in FIG. 4 in the front (an arrow 302) when the zooming operation is switched from an optical zooming operation to a pseudo zooming operation. At this time, since the conjugate length of the relay lens system 3 does not change, the magnification of the relay lens system 3 changes from 1/e to e. At the same time, the ocular 5 is returned to the position shown in (a) in FIG. 3. Consequently, the lens positions shown in (c) in FIG. 4 are the same as those shown in (c) in FIG. 3, so that a pseudo zooming operation is performed by moving the first and the second lens elements 5a and 5b of the ocular 5 along the arrows 507 and 508 from the position shown in (c) to the position shown in (d) in FIG. 4. In such an operation, the finder magnification is larger in the orders of (a)→(b), and (c)→(d) in FIG. 4. The magnifications are the same in (b) and (c) in FIG. 4.

Figure 5:
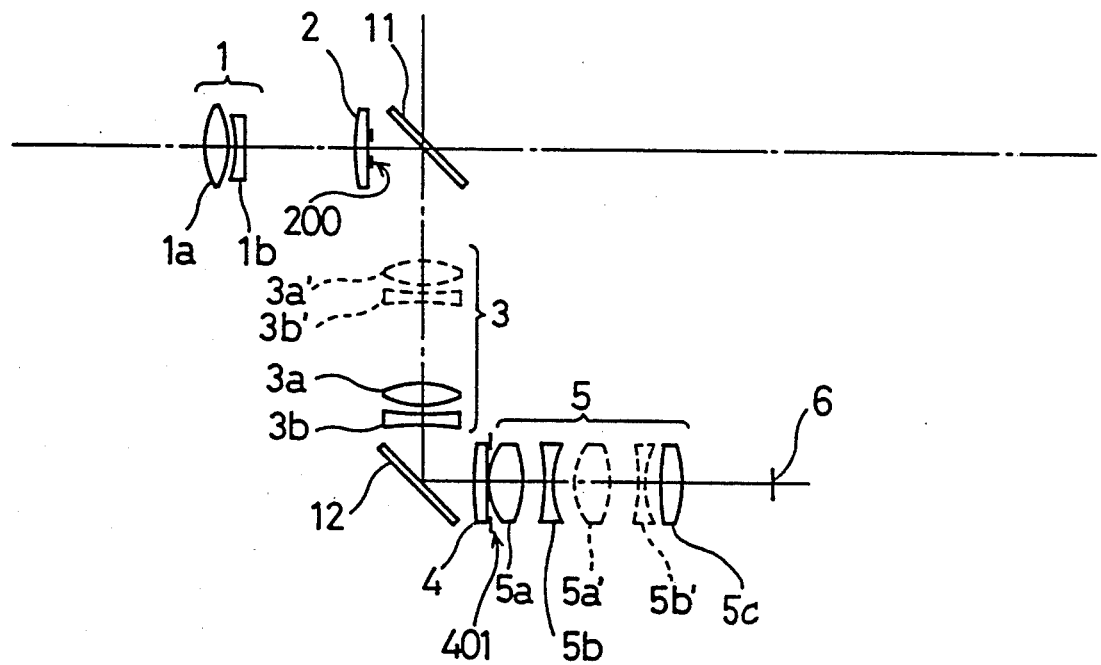
FIG. 5 is a cross sectional view of the embodiment shown in FIGS. 3 or 4 which is so constructed as to be applicable in a camera.

When the finder optical system shown in FIG. 3 or FIG. 4 is installed in a camera, to decrease the length from the front to the rear of the camera (the thickness of the camera), it is desirable to z-shapedly bend the optical path of the finder optical system as shown in FIG. 5. In the embodiment of FIG. 5, to bend the optical path, a first mirror 11 is provided between the first condenser lens 2 and the relay lens system 3, and a second mirror 12 is provided between the relay lens system 3 and the second condenser lens 4, respectively. The dotted FIGS. 3a' and 3b' show the predetermined positions to which the positive lens element 3a and the negative lens element 3b of the relay lens system 3 move. Similarly, the dotted FIGS. 5a' and 5b' show the positions to which the first and the second lens units 5a and 5b of the ocular 5 move to perform a zooming operation. In the embodiment shown in FIG. 5, the optical axis of the light which enters the first mirror 11 and that of the light which leaves out of the mirror 11 are at right angles. The angle can be an acute angle or an obtuse angle, if necessary. The angle formed by the optical axis of the light which enters the second mirror 12 and that of the light which leaves the mirror 12 can also be an acute angle or an obtuse angle.

Figure 6:
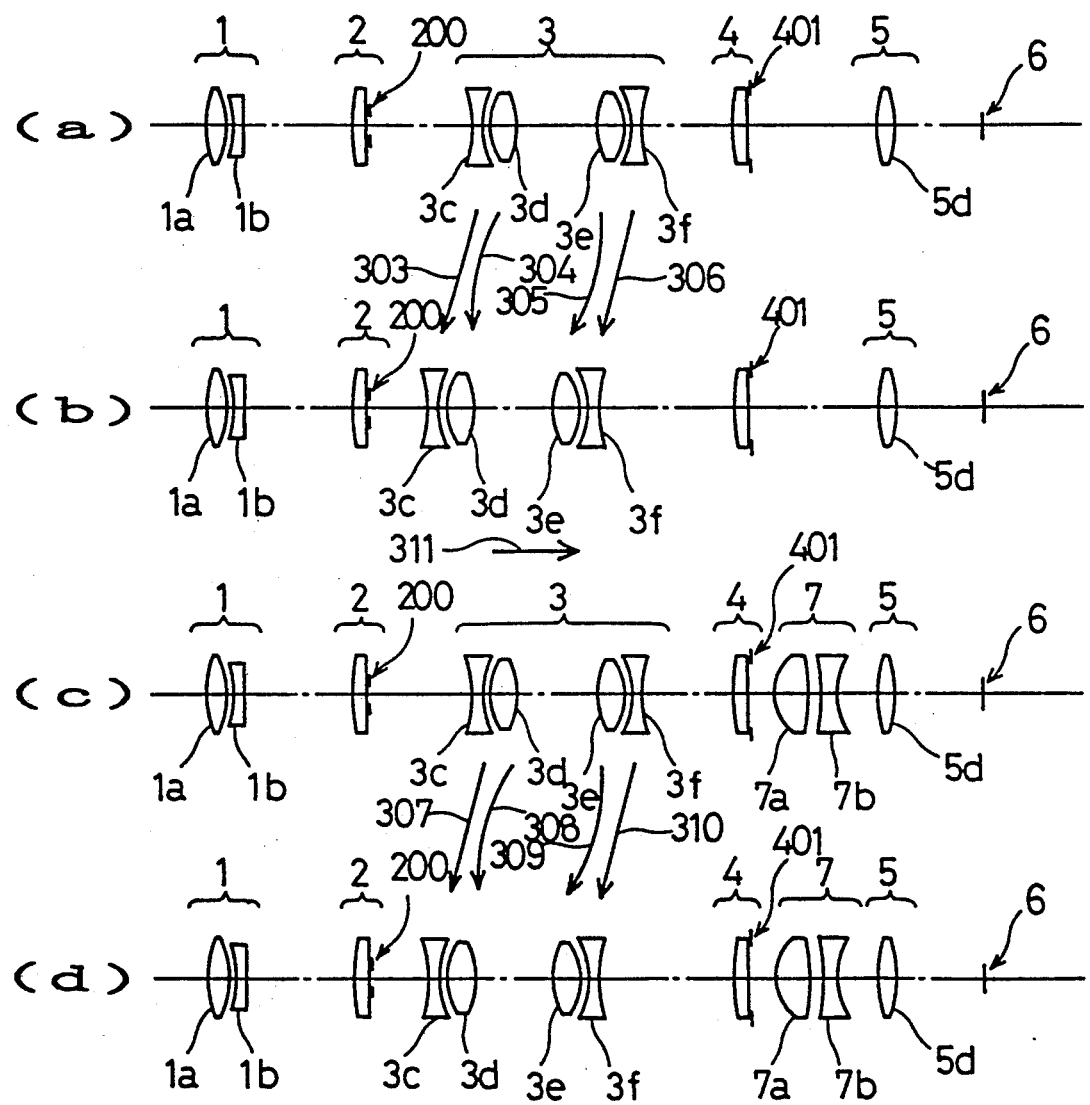
FIG. 6 is a cross sectional view of another embodiment of the present invention.

In the embodiment shown in FIG. 6, an optical zooming operation and a pseudo zooming operation are performed by the relay lens system 3. A zooming operation by the relay lens system 3 is assisted by a two-step change of the focal length of the ocular 5 (an insertion of an afocal converter 7). In other words, the movement amount of the relay lens system 3 is decreased by changing the focal length of the ocular 5. The focal length condition of the ocular 5 is changed to the following two conditions: the condition where there is only the stationary positive lens element 5d as shown in (a) and (b) in FIG. 6; and the condition where there is an afocal converter 7 between the positive lens element 5d and the second condenser lens 4 as shown in (c) and (d) in FIG. 6. In this embodiment, the afocal converter 7 includes a positive lens element 7a and a negative lens element 7b as shown in (c) and (d) in FIG. 6. The relay lens system 3 has a first lens element 3c, a second lens element 3d, a third lens element 3e, and a fourth element 3f.

In FIG. 6, in an optical zooming operation, when the afocal converter 7 is not inserted on the object side of the ocular 5, the first, the second, the third, and the fourth lens elements 3c, 3d, 3e, and 3f of the relay lens system 3 move along the arrows 303, 304, 305, and 306, respectively from the shortest focal length condition to the longest focal length condition. The details are: the first and the fourth lens elements 3c and 3f move while maintaining a constant distance between them. As the four lens units move, the distance between the first and the second elements 3c and 3d and the distance between the third and the fourth elements 3e and 3f become shorter at first, and then, they become longer to correct the movement of the secondary image plane at a zooming operation. Then, the relay lens system returns to the original position (the arrow 311); the afocal converter 7 is inserted on the object side of the ocular 5 as shown in (c) in FIG. 6. Under this condition, the first, the second, the third, and the fourth lens elements 3c, 3d, 3e, and 3f move along the arrows 307, 308, 309, and 310 in the same manner as in an optical zooming operation. By these movements, a pseudo zooming operation is performed. In this embodiment, the secondary image plane does not move as the relay lens system moves as described above, so that the second condenser lens 4 and the lenses arranged on the pupil side of the condenser lens 4 do not move. The finder magnification is larger in the orders of (a)→(b), and (c)→(d) in FIG. 6. The magnifications in (b) and (c) in FIG. 6 are the same. In this embodiment, the afocal converter 7 can be inserted on the optical axis of the ocular 5 to stepwisely change the focal length of the entire optical system as described above. Therefore, a mechanical arrangement for the finder optical system can be made simple because only the insertion of the afocal converter 7 is required to maintain the total length of the ocular 5.

Figure 7:
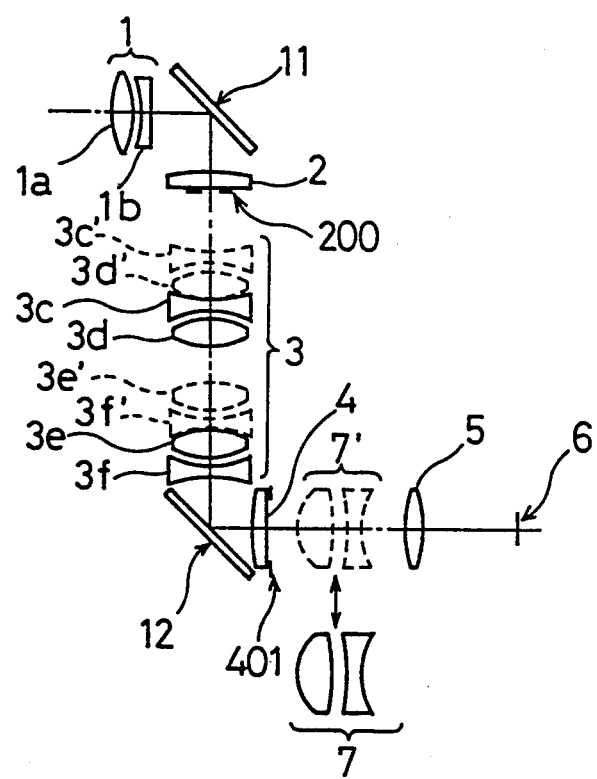
FIG. 7 is a cross sectional view of the embodiment shown in FIG. 6 which is so constructed as to be applicable in a camera.

FIG. 7 shows a variation of the method to install the finder optical system having an arrangement shown in FIG. 6 in a camera. In this optical system, the first mirror 11 and the second mirror 12 are employed. Their workings are the same as those of the mirrors 11 and 12 in FIG. 5. The dotted FIGS. 3c', 3d', 3e', and 3f' show the position to which the lens elements 3c, 3d, 3e, and 3f of the relay lens system 3 move, respectively, and a dotted FIG. 7' shows the afocal converter inserted on the object side of the ocular 5.

Figure 8:
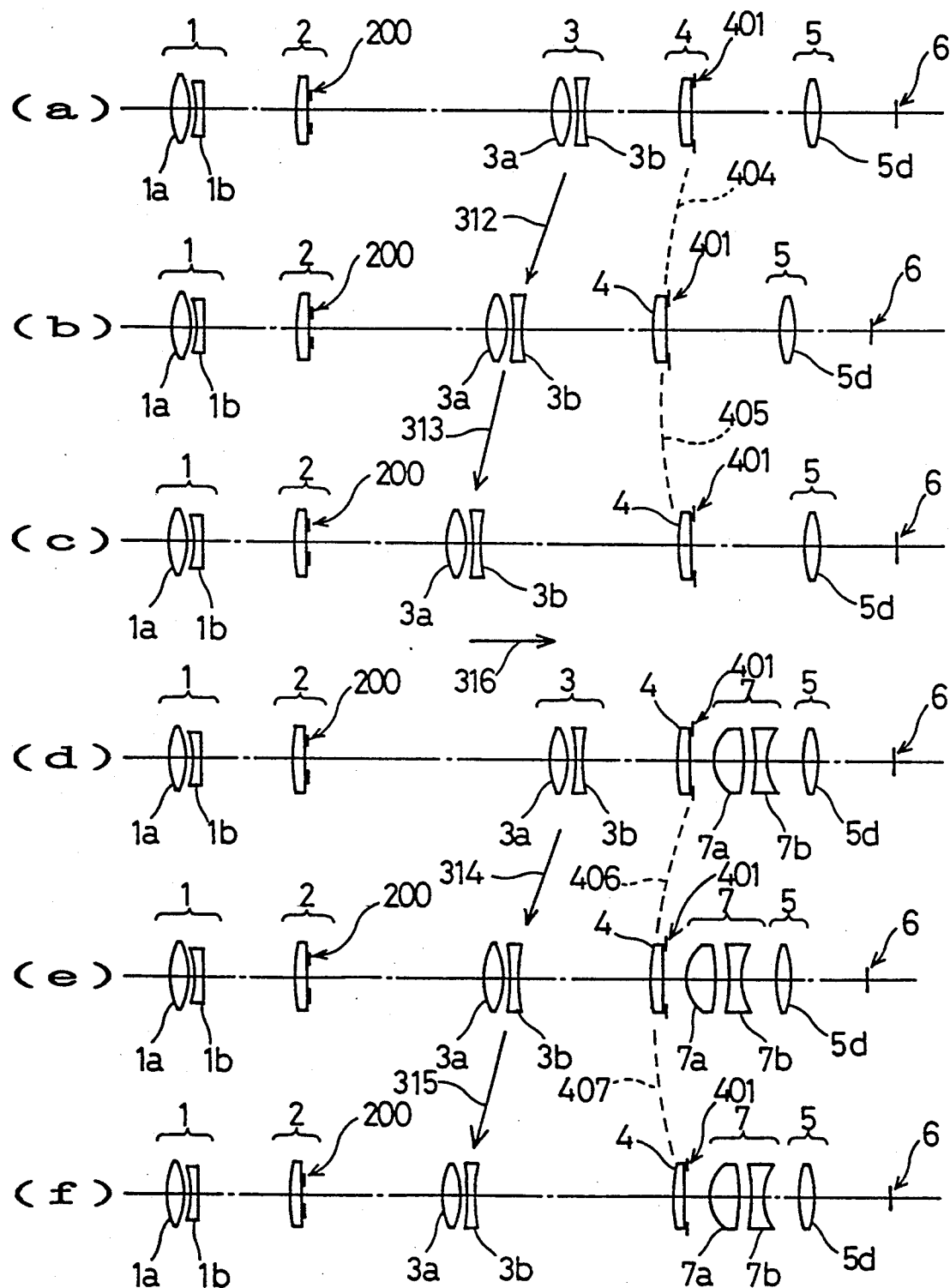
FIG. 8 is a cross sectional view of another embodiment of the present invention.

In FIG. 8, an optical zooming operation and a pseudo zooming operation are performed by the relay lens system 3 similarly to in the embodiment shown in FIG. 6. A zooming operation by the relay lens system 3 is assisted by a two-step change of the focal length of the ocular 5 (an insertion of the afocal converter 7). The relay lens system 3 has, similarly to that in the embodiment shown in FIG. 3, a positive lens element 3a and a negative lens element 3b, which move simultaneously. That is, in an optical zooming operation ((a) to (c) in FIG. 8), they move along the arrows 312 and 313; in a pseudo zooming operation ((d) to (f) in FIG. 8), they move along the arrows 314 and 315. As they move, the total length of the relay lens system 3 changes, According to this, the secondary image plane moves in the optical zooming operation. For a compensation of the movement of it, the condenser lens 4, the field frame 401, the ocular 5, and the pupil 6 simultaneously move along the dotted lines 404 and 405. In a pseudo zooming operation, the afocal converter 7 also moves along the dotted lines 406 and 407 in a linked body with the above four. The zooming operation is switched from an optical zooming operation to a pseudo zooming operation when the relay lens system 3 returns to the original position along the arrow 316. In this embodiment, the finder magnification is larger in the orders of (a)→(b)→(c), and (d)→(e)→(f) in FIG. 8. The magnifications of (c) and (d) in FIG. 8 are the same.

Figure 9:
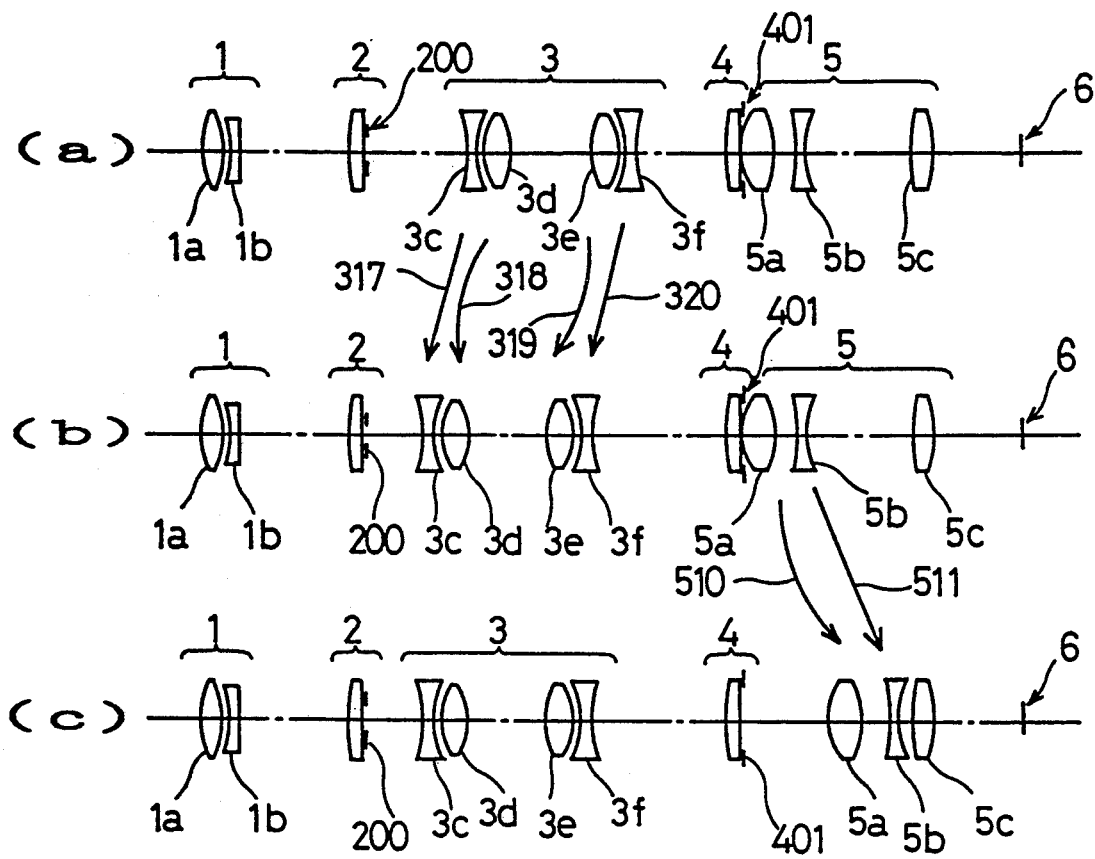
FIG. 9 is a cross sectional view of another embodiment of the present invention.

In the embodiment shown in FIG. 9, where a relay lens system 3 of the same type as that in FIG. 6 is used, an optical zooming operation is performed in the same manner as in the embodiment in FIG. 6. An ocular 5 of the same type as that shown in FIGS. 3 and 4 is used, and the pseudo zooming operation is performed in the same manner as in the embodiment in FIGS. 3 and 4. In the optical zooming operation, the first, the second, the third, and the fourth lens elements 3c, 3d, 3e, and 3f of the relay lens system 3 move along the arrows 317, 318, 319, and 320, respectively, from the shortest focal length condition to the longest focal length condition. In the pseudo zooming operation, the first and the second elements 5a and 5b of the ocular 5 move along the arrows 510 and 511. In this embodiment, since the secondary image plane does not move as the relay lens system 3 moves, the second condenser lens 4 and the lenses arranged on the pupil side of the condenser lens 4 do not move. The finder magnification is larger in the order of (a)→(b)→(c) in FIG. 9.

Figure 10:
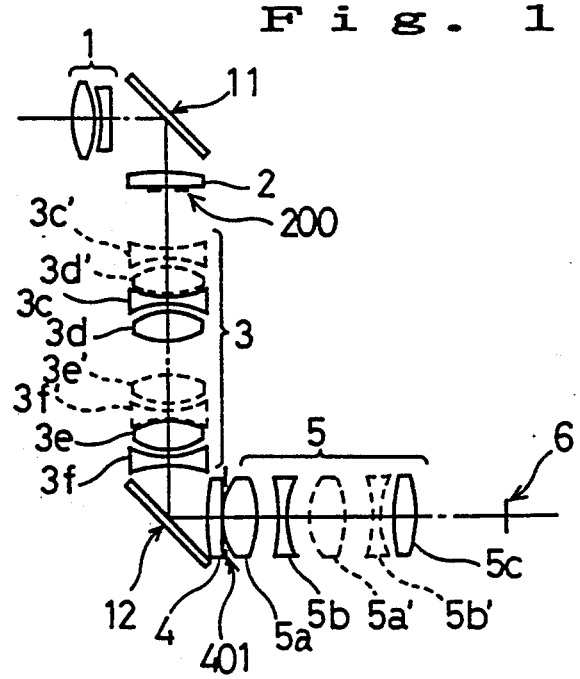
FIG. 10 is a cross sectional view of the embodiment shown in FIG. 9 which is so constructed as to be applicable in a camera.

FIG. 10 shows a variation of the method to install the finder optical system having an arrangement shown in FIG. 9 in a camera. In this optical system, the first mirror 11 and the second mirror 12 are employed. Their workings are the same as those of the mirrors 11 and 12 in FIGS. 5 and 7.

In the above-described embodiments, an optical zooming operation and a pseudo zooming operation are performed separately. However, the above are not the only embodiments of the present invention. According to the present invention, an optical zooming operation and a pseudo zooming operation do not always have to be separately performed as far as a predetermined amount of zooming is obtained in the end. Therefore, for example, in the embodiment shown in FIG. 3, it is possible that the relay lens system 3 performs a part of an optical zooming operation and that the ocular 5 performs the other part of the optical zooming operation and a pseudo zooming operation. It is also possible that the relay lens system 3 performs an optical zooming operation and a part of a pseudo optical zooming operation and that the ocular 5 performs the other part of the pseudo zooming operation.

The field frame is, as described above, provided on the primary or the secondary image plane. In any case, since the ocular 5 performs the zooming operation or the changing of the focal length in the above embodiments, the field frame seen through the finder window in a pseudo zooming operation is enlarged. If the field frame is enlarged when a trimming area is enlarged, a pseudo zooming effect is not obtained. Therefore, it is required to prevent the enlargement of the field frame seen through the finder window. To prevent the enlargement of the field frame, the field frame is made variable so that it becomes smaller in response to the pseudo zooming operation. As concrete examples, there are methods in which the size of the field frame is mechanically changed in synchronization with a movement of the lenses which perform the pseudo zooming operation and in which the size of a field frame formed on a liquid crystal display device (LCD) is electrically controlled.

Figure 11A:
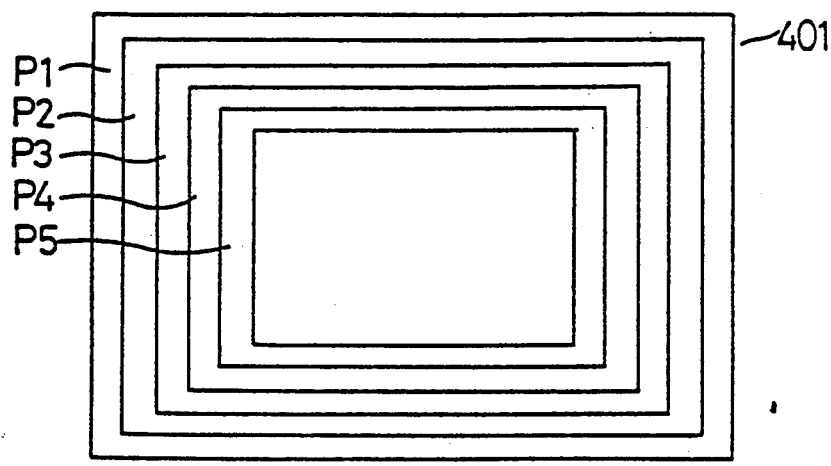
FIGS. 11a, 11b and 11c show the field frames employed in a finder optical system according to the present invention.
Figure 11B:
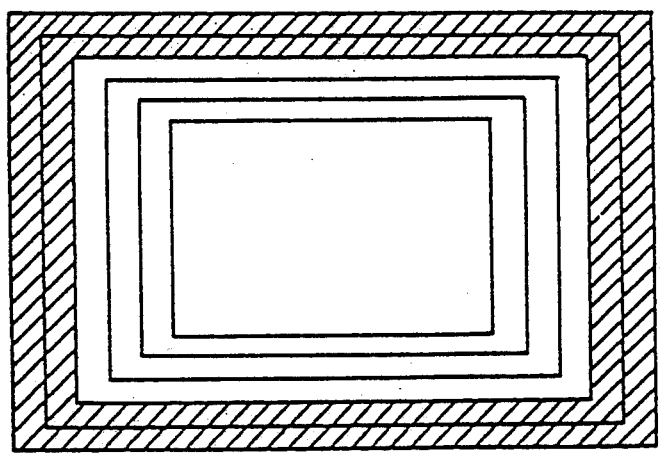
Figure 11C:
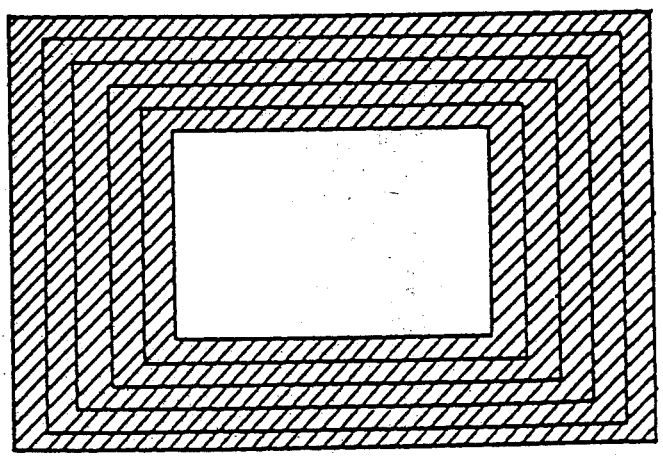

The latter method will hereinafter be explained. FIGS. 11a to 11c shows the patterns of a field frame 401 formed on LCD. The size of the field frame 401 can be changed to five sizes. P1 to P5 in FIG. 11 show the five sizes. In FIG. 11, FIG. 11(a) shows the condition of the field frame 401 at the shortest focal length condition in the pseudo zooming operation, FIG. 11(b) shows the condition of it at the middle focal length condition in it, and FIG. 11(c) shows the condition of it at the longest focal condition in it. The field frame 401 is the largest at the shortest focal length condition. According to a zooming operation, the patterns become non-permeable to light in the order of the patterns P1→P2→P3→P4→P5; all the patterns P1 to P5 become non-permeable at the longest focal length condition. Therefore, the area of the permeable portion is the smallest at the longest focal length condition, and equivalently, the field frame becomes minimum. The control signals which make these patterns permeable or non-permeable are formed based on the information on the positions of the lenses which perform the pseudo zooming operation. The information on the positions of the lenses is obtained by so attaching a fretting element to fret a position decoder pattern on a lens holder. It can also be obtained from the trimming information.

Figure 12:
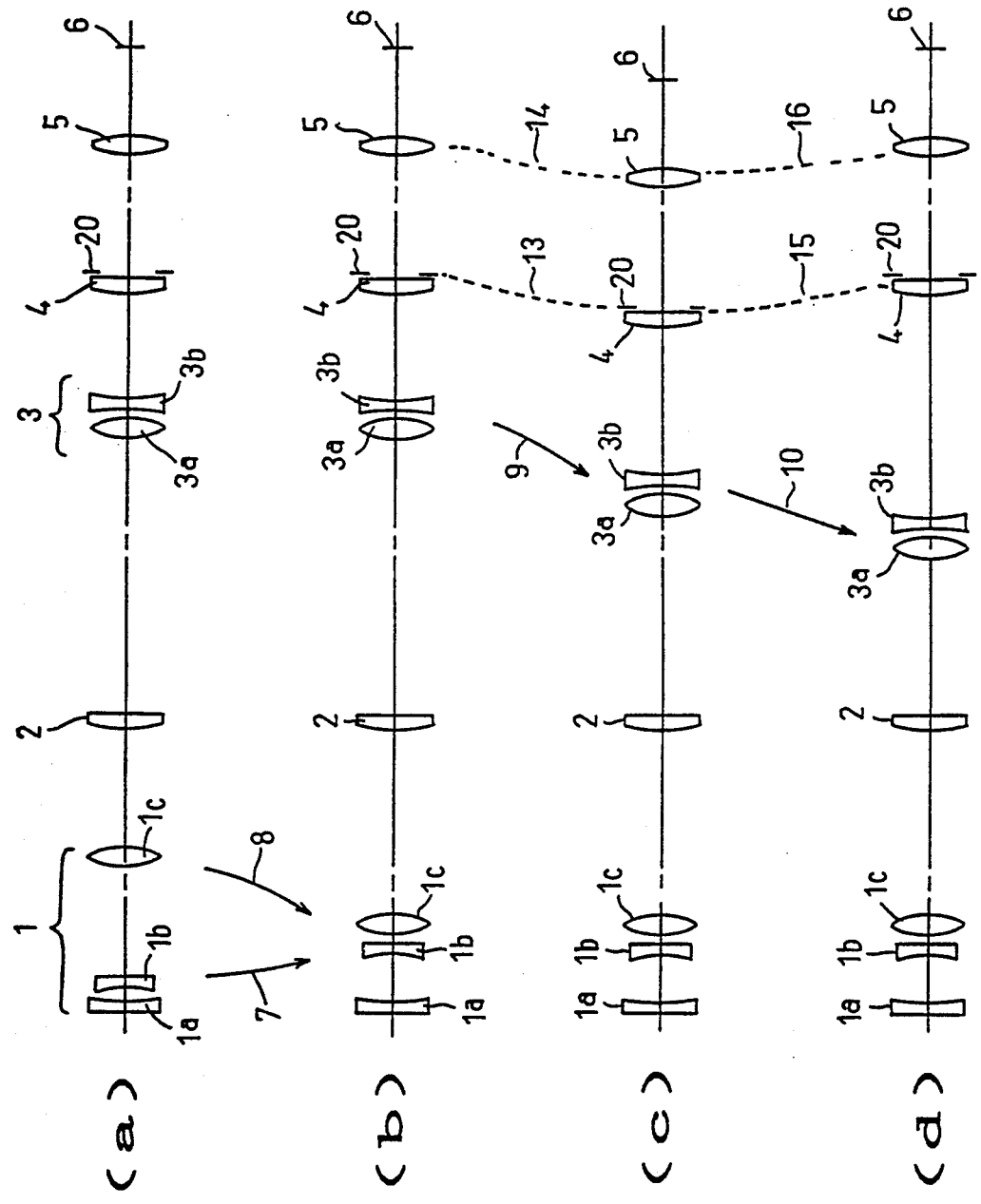
FIG. 12 is a cross sectional view of another embodiment of the present invention.

Next, the embodiments of FIG. 12 to FIG. 20 will be described in which the objective lens system concerns the optical zooming or pseudo zooming operation. In FIG. 12, the finder optical system comprises, from the object side, an objective lens system 1, a first condenser lens 2, a relay lens system 3, a second condenser lens 4, and an ocular 5. The objective lens system 1 has a first lens element 1a which is stationary, and a second and a third lens elements 1b and 1c which move to perform a zooming operation. The relay lens system 3, which is used as optical means for erecting the inverted image formed by the objective lens system 1, has a positive lens element 3a and a negative lens element 3b, both of which are movable.

The first condenser lens 2 is arranged at the image plane of the objective lens system 1, and the second condenser lens 4 is arranged with the image plane of the relay lens system 3, respectively. In FIG. 12, 6 represents the pupil.

When, in a camera, a taking lens system (not illustrated) is zoomed from the shortest focal length condition to the longest focal length condition, the driving force of the zooming is mechanically transmitted to the finder optical system in synchronization with the zooming operation, so that the second and the third lens elements 1b and 1c of the objective lens system 1 move along the arrows 7 and 8 from the position shown in (a) to the position shown in (b) in FIG. 12. The optical zooming is performed by the movement of the second and the third lens elements 1b and 1c. In this embodiment, the zooming by the objective lens system 1 corresponds to the optical zooming, so that the objective lens system 1 cannot further perform the zooming operation beyond a range of the optical zooming. The pseudo zooming operation is performed by the movement of the relay lens system 3, with the objective lens system fixed at the position (b) in FIG. 12, from the position shown in (b) and the position shown in (c) in FIG. 12 along the arrows 9 and 10. In such operation, the finder magnification is larger in the order of (a)→(b)→(c)→(d) in FIG. 12. The secondary image plane moves as the relay lens system 3 moves. For a compensation of it, the ocular 5 moves along the dotted lines 14 and 16 as well as the second condenser lens 4 moves along the dotted lines 13 and 15, which means that the total length of the finder optical system changes.

It is preferable to provide a field frame 20 of a finder on the secondary image plane (the second condenser lens 4). This is because, when the field frame 20 is provided on the secondary image plane, the zooming is performed substantially in front (on the object side) of the secondary image plane, so that it is not necessary that the size of the field frame 20 change. In the embodiment shown in FIG. 12, the objective lens system 1 performs the optical zooming operation, and the relay lens system 3 performs the pseudo zooming operation. It is also possible that the objective lens system 1 performs the pseudo zooming operation and that the relay lens system 3 performs the optical zooming operation.

Figure 1A:
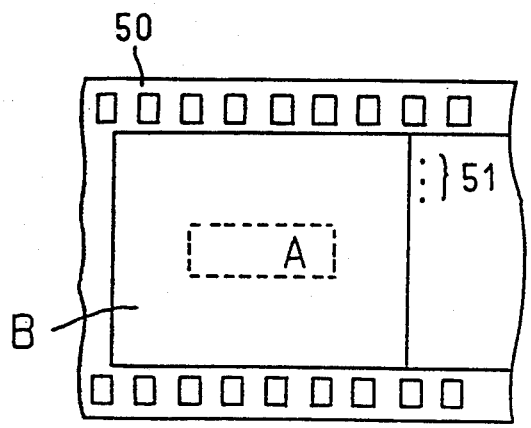
FIGS. 1a, 1b and 1c are explanatory drawings of a trimming system.
Figure 1B:
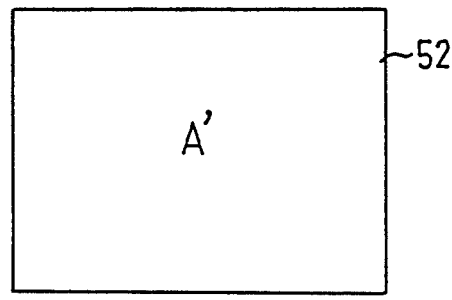
Figure 1C:
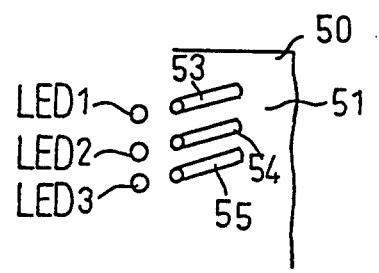
Figure 13:
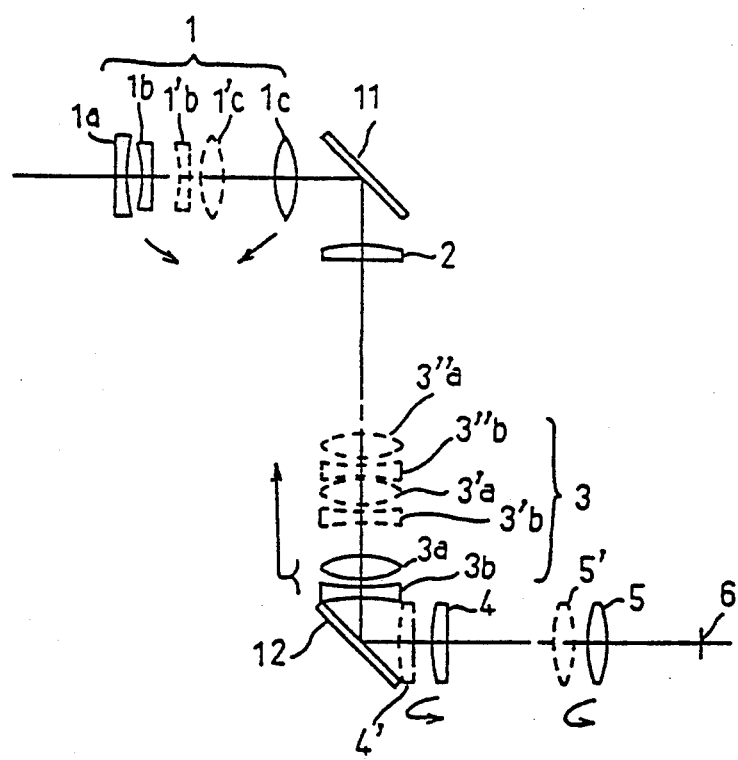
FIG. 13 is a cross sectional view of the embodiment shown in FIG. 12 which is so constructed as to be applicable in a camera.

FIG. 13 shows a variation of the method to install the finder optical system having an arrangement shown in FIG. 12 in a camera. In the embodiment of FIG. 13, a first mirror 11 is arranged between the objective lens system 1 and the first condenser lens 2; a second mirror, between the relay lens system 3 and the second condenser lens 4. Their workings are the same as those of the mirrors 11 and 12 in FIG. 5. The dotted FIGS. 1b' and 1c' show the position (the longest focal length condition) to which the second and the third lens elements 1b and 1c of the objective lens system move. Similarly, the dotted FIGS. 3a' and 3b', and 3a" and 3b" show the positions to which the first and the second lens elements 3a and 3b of the relay lens system 3 move in a zooming operation. 4' and 5' show the positions to which the second condenser lens 4 and the ocular 5 move, respectively, in accordance with the above-described movements of the lenses.

Figure 14:
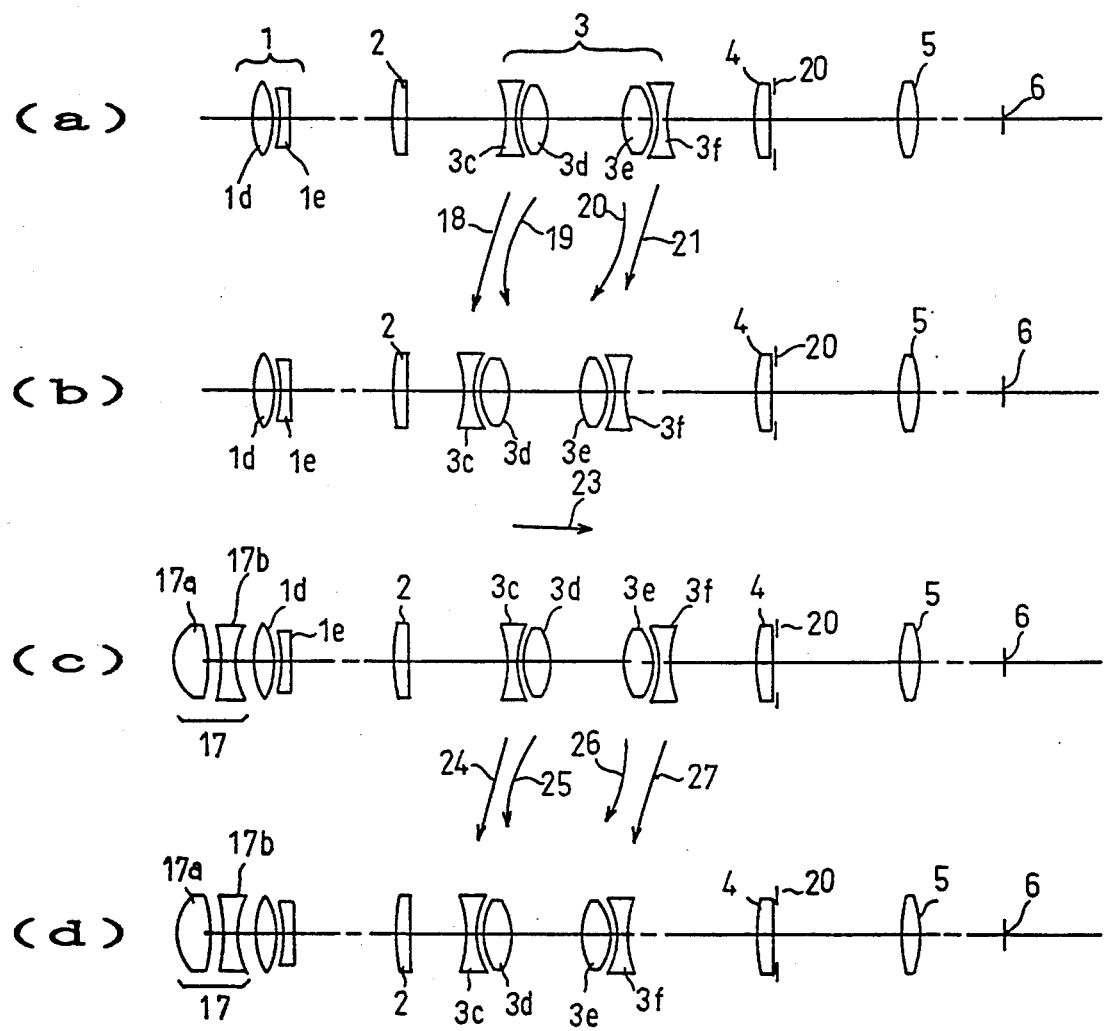
FIG. 14 is a cross sectional view of another embodiment of the present invention.

In the embodiment shown in FIG. 14, the relay lens system 3 performs both of the optical and the pseudo zooming operations. The zooming operation by the relay lens system 3 is assisted by a two-step change of the focal length of the objective lens system 1. In other words, the movement amount of the relay lens system 3 is decreased by the two-step change of the focal length of the objective lens system 1 (an insertion of an afocal converter (7)). The focal length condition of the objective lens system 1 is changed to the following two conditions: the condition where there are only a positive and a negative lens elements 1d and 1e which are stationary as shown in (a) and (b) in FIG. 14; and the condition where there is an afocal converter 17 on the object side of the positive lens element 1d as shown in (c) and (d) in FIG. 14. In this embodiment, the afocal converter 17 has a positive lens element 17a and a negative lens element 17b as shown in FIG. 14.

In this embodiment, the relay lens system 3 has a first lens element 3c, a second lens element 3d, a third lens element 3e, and a fourth lens element 3f so that the relay lens system 3 itself compensates for the change of the secondary image plane caused by the movement of the relay lens system 3 in a zooming operation. The details are: all the above lens units of the relay lens system 3 are moved to change a magnification. To compensate for a change of the conjugate length caused by the above lens movements, the distance between the second element 3d and the third element 3f is changed. The following table shows the axial distances of the first, the second, the third, and the fourth lens elements 3c to 3f when $\beta=0.65$, $\beta=1.0$, and $\beta=1.54$, respectively ($\beta$ is a magnification of the relay lens system 3).

| Lens | Refractive Power | $\beta = 0.65$ Distance 15.43 | $\beta = 1.00$ Distance 21.77 | $\beta = 1.54$ Distance 28.11 |
|------|------------------|-------------------------------|-------------------------------|-------------------------------|
| 3c   | −0.085           | 2.79                          | 2.62                          | 2.79                          |
| 3d   | 0.097            | 14.15                         | 14.5                          | 14.15                         |
| 3e   | 0.097            | 2.79                          | 2.62                          | 2.79                          |
| 3f   | −0.085           | 28.11                         | 21.77                         | 15.43                         |

In FIG. 14, where the afocal converter 17 is not inserted on the optical axis at the optical zooming operation, the first, the second, the third, and the fourth lens elements 3c, 3d, 3e, and 3f move along the arrows 18, 19, 20, and 21, respectively. Then, each lens element of the relay lens system 3 returns to the original position as shown by the arrow 23. At this time, the afocal converter 17 is inserted in front of the objective lens system 1 as shown in (c) in FIG. 14. The first, the second, the third, and the fourth lens elements 3c, 3d, 3e, and 3f move along the arrows 24, 25, 26, and 27, respectively, as shown in (c) and (d) in FIG. 14 to perform the pseudo zooming operation. In this embodiment, the finder magnification is larger in the orders of (a)→(b), and (c)→(d) in FIG. 14. The magnifications of (b) and (c) in FIG. 14 are the same.

Figure 15:
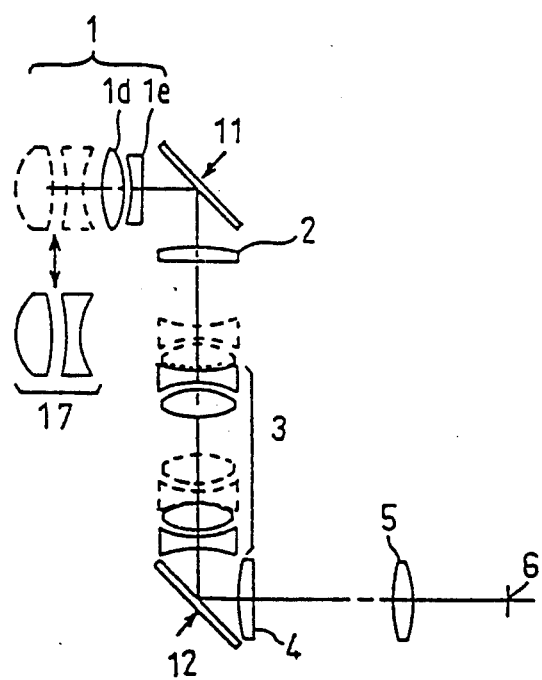
FIG. 15 is a cross sectional view of the embodiment shown in FIG. 14 which is so constructed as to be applicable in a camera.

FIG. 15 shows a variation of the method to install an optical finder system having the same arrangement as that of the embodiment shown in FIG. 14 in a camera. The first and the second mirrors 11 and 12 are arranged to bend an optical path. Their workings are the same as those of the mirrors 11 and 12 in FIG. 3.

Figure 16:
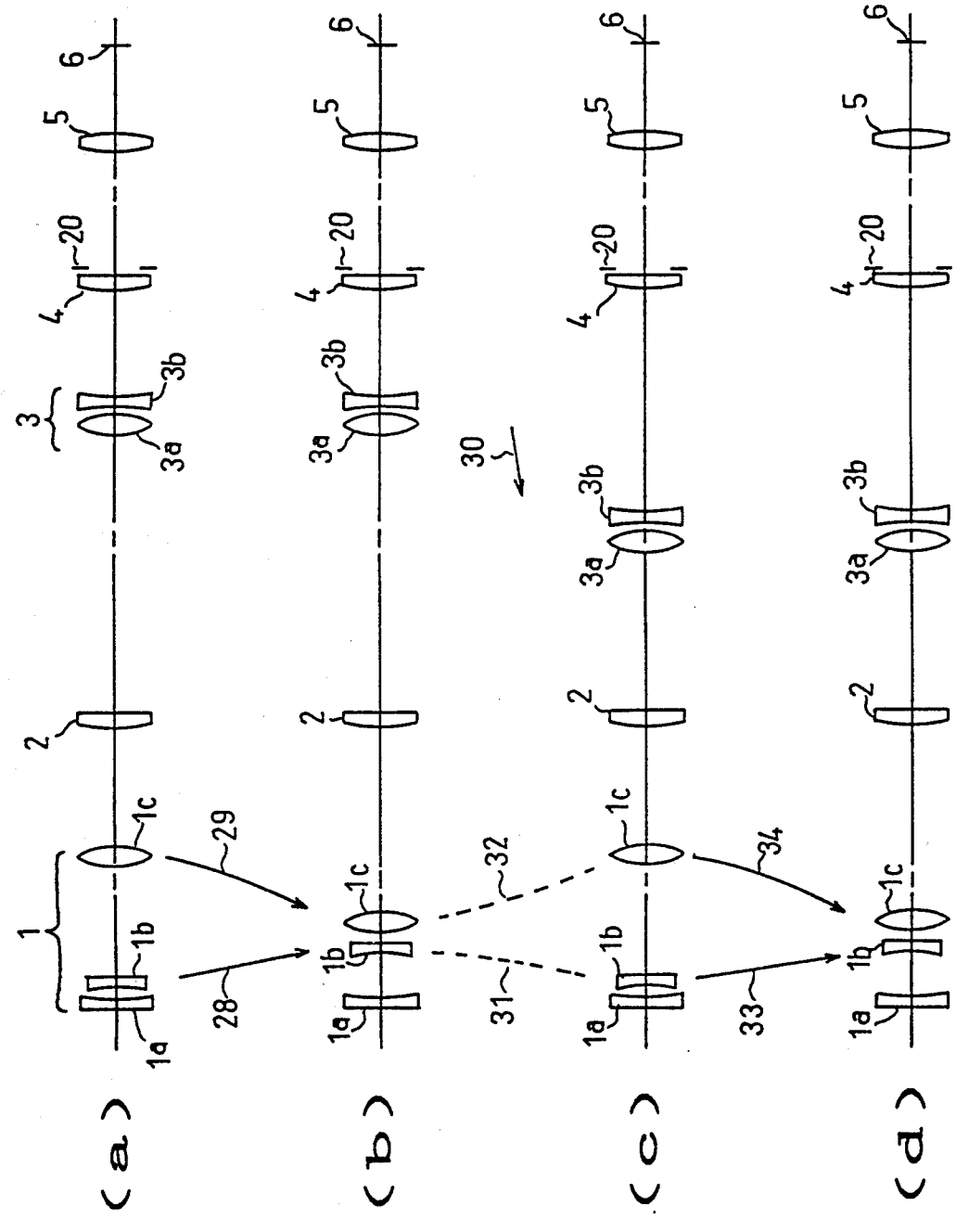
FIG. 16 is a cross sectional view of another embodiment of the present invention.

FIG. 16 shows an embodiment where the objective lens system 1 is zoomed in both the optical zooming operation and the pseudo zooming operation, and where the position, along the optical axis, of the relay lens system 3 is changed to two positions (the positions shown in (a) and (b), and in (c) and (d) in FIG. 16). The above two positions are carefully chosen so that the positions, along the optical axis, of the primary image plane formed by the objective lens system 1 and the secondary image plane formed by the relay lens system 3 do not change.

In FIG. 16, the relay lens system 3 is set to the first predetermined position nearer to the pupil 6 at an optical zooming operation, while the second and third lens element 1b and 1c of the objective lens system 1 move along the arrows 28 and 29, respectively. Then, the second and the third lens elements 1b and 1c of the objective lens system 1 return to the original positions along the arrows 31 and 32, respectively. At this time, the relay lens system 3 moves to the second predetermined position nearer to the object in an instant. Thereafter, the second and the third lens elements 1b and 1c of the objective lens system 1 move from the position shown in (c) to the position shown in (d) in FIG. 16 along the arrows 33 and 34, respectively, to perform the pseudo zooming operation. In this embodiment, the finder magnification is larger in the orders of (a)→(b), and (c)→(d) in FIG. 16. The magnifications of (b) and (c) in FIG. 16 are the same.

Figure 17:
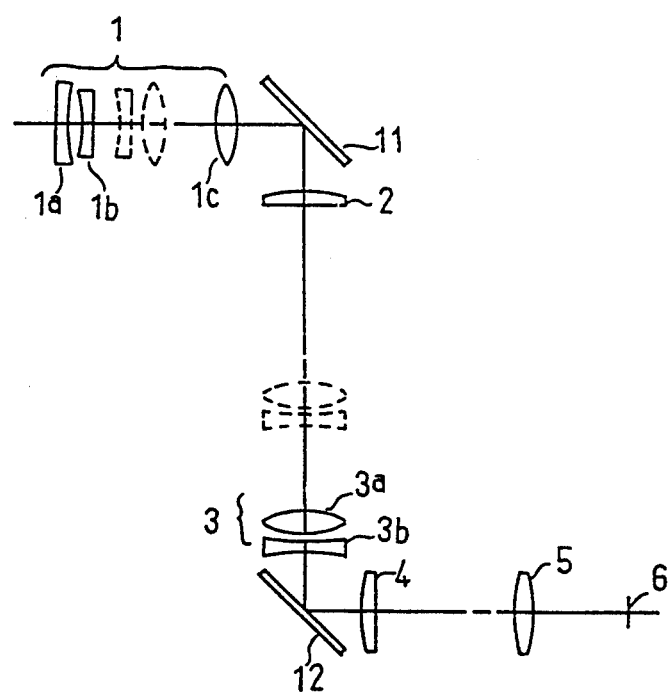
FIG. 17 is a cross sectional view of the embodiment shown in FIG. 16 which is so constructed as to be applicable in a camera.

FIG. 17 shows a variation of the method to install an optical finder system having the same arrangement as that of the embodiment shown in FIG. 16 in a camera. The first and the second mirrors 11 and 12 are employed in the optical system. Their workings are the same as those of the mirrors 11 and 12 in FIG. 3.

Figure 18:
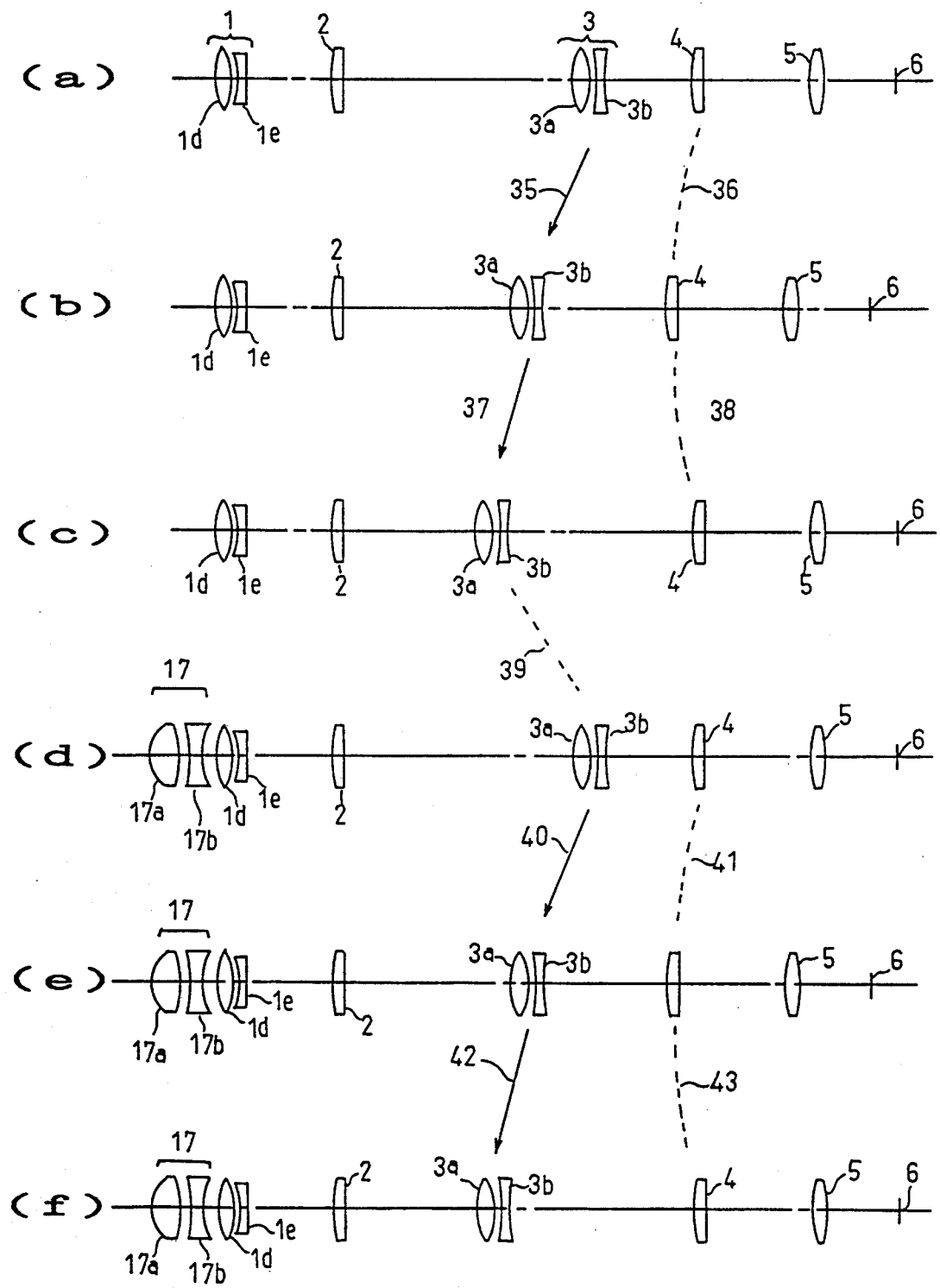
FIG. 18 is a cross sectional view of another embodiment of the present invention.

In the embodiment shown in FIG. 18, the relay lens system 3 performs both the optical zooming operation and the pseudo zooming operation similar to in the embodiment shown in FIG. 14, and a two-step change of the focal length of the objective lens system 1 by the afocal lens 17 assists a zooming by the relay lens system 3. The difference from the embodiment shown in FIG. 14 is that the relay lens system 3, which has only the first and the second lens elements 3a and 3b, has no function to self-compensate for a shift of the image plane.

In (a) to (c) in FIG. 18, an optical zooming operation is performed; in (d) to (f) in FIG. 18, a pseudo zooming operation is performed. In the change of the conditions from (c) to (d) in FIG. 18, the focal length of the objective lens system 1 is changed by the insertion of the afocal converter 17; the relay lens system 3 returns to the original position (the position shown in (a) in FIG. 14). The arrows 35, 37, 39, 40, and 42 show the movements of the relay lens system 3; the dotted lines 36, 38, 41, and 43 show the movements of the second condenser lens 4 in compensating for an image plane shift.

Figure 19:
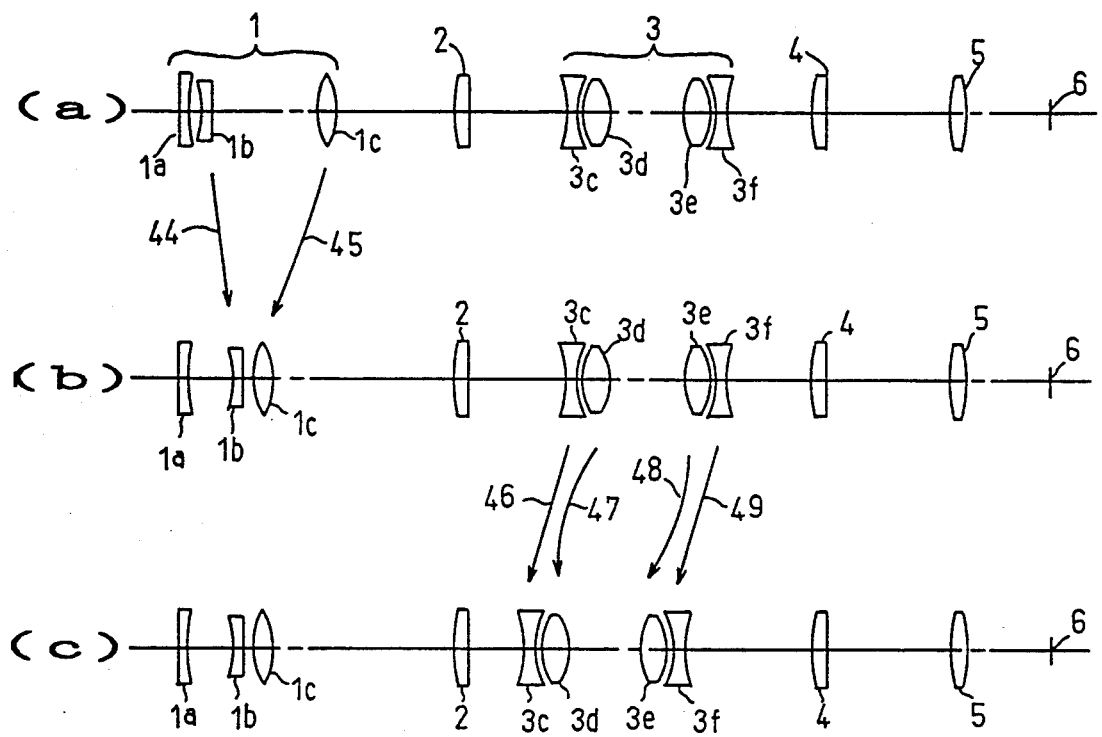
FIG. 19 is a cross sectional view of another embodiment of the present invention.

In the embodiment shown in FIG. 19, similar to in the embodiment shown in FIG. 12, the objective lens system 1 performs the optical zooming operation; the relay lens system 3 performs the pseudo zooming operation. Different from the embodiment shown in FIG. 12, the optical system shown in FIG. 19 is so constructed as to have a self-compensation function for an image plane shift. To compensate for the image plane shift, the relay lens system 3 has a first, a second, a third, and a fourth lens elements 3c, 3d, 3e, and 3f like the relay lens system 3 in the embodiment shown in FIG. 14. All the lens elements of the relay lens system 3 are moved to change a magnification. To compensate for a change of the conjugate length caused by the above lens movements, the distance between the second and the third lens elements 3d and 3f is changed. In FIG. 19, the arrows 44 and 45 show the movements of the second and the third lens elements 1b and 1c, respectively; the arrows 46, 47, 48, and 49 show the movements of each lens element of the relay lens system 3.

Figure 20:
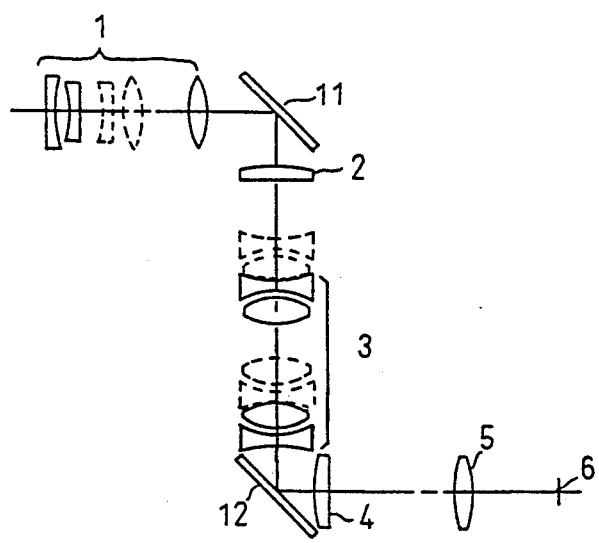
FIG. 20 is a cross sectional view of the embodiment shown in FIG. 19 which is so constructed as to be applicable in a camera.

FIG. 20 shows a variation of the method to install an optical finder system having the same arrangement as that of the embodiment shown in FIG. 19 in a camera. The first and the second mirrors 11 and 12 are arranged. Their workings are the same as those of the mirrors 11 and 12 in FIG. 3.

In the above-described embodiments of FIGS. 12 to 20, the optical zooming operation and the pseudo zooming operation are performed separately. However, according to the present invention, the optical zooming operation and the pseudo zooming operation do not always have to be separately performed as far as a predetermined amount of zooming is obtained in the end. Therefore, for example, in the embodiment in FIG. 12, it is possible that the objective lens system 1 performs a part of the optical zooming operation and that the relay lens system 3 performs the other part of the optical zooming operation and the pseudo zooming operation. It is also possible that the objective lens system 1 performs the optical zooming operation and a part of the pseudo optical zooming operation and that the relay lens system 3 performs the other part of the pseudo zooming operation.

In all of the above-described embodiments of FIGS. 12 to 20, it is preferable to arrange the field frame 20 on the secondary image plane (the second condenser lens 4), since it becomes unnecessary to zoom the ocular 5 or to change the focal length of the ocular 5 in each of the above-described embodiments.

As above-described, with respect to the embodiment of FIGS. 3 to 10, if the ocular 5 is zoomed, the field frame seen through the finder window is enlarged at the pseudo zooming operation. If the field frame is enlarged when the trimming area is enlarged, a pseudo zooming effect is not obtained. Therefore, the enlargement of the field frame seen in the finder window must be prevented. To prevent the enlargement, means for making a field frame variable are required so that the field frame becomes smaller as a pseudo zooming operation proceeds.

On the contrary, in the embodiments of FIGS. 12 to 20, since the focal length of the eyepiece 5 does not change during the pseudo zooming operation, such means are not required. This means that the finder optical system becomes a simple arrangement.

In the above-described embodiments of FIGS. 7, 10, 13, 15, 17, and 20, the angle formed by the optical axis of the light which enters the mirror 11 or 12 and that of the light which leave the mirror 11 or 12 may be set to an acute angle or obtuse angle as well as a right angle, as mentioned with respect to FIG. 5.

Figure 21:
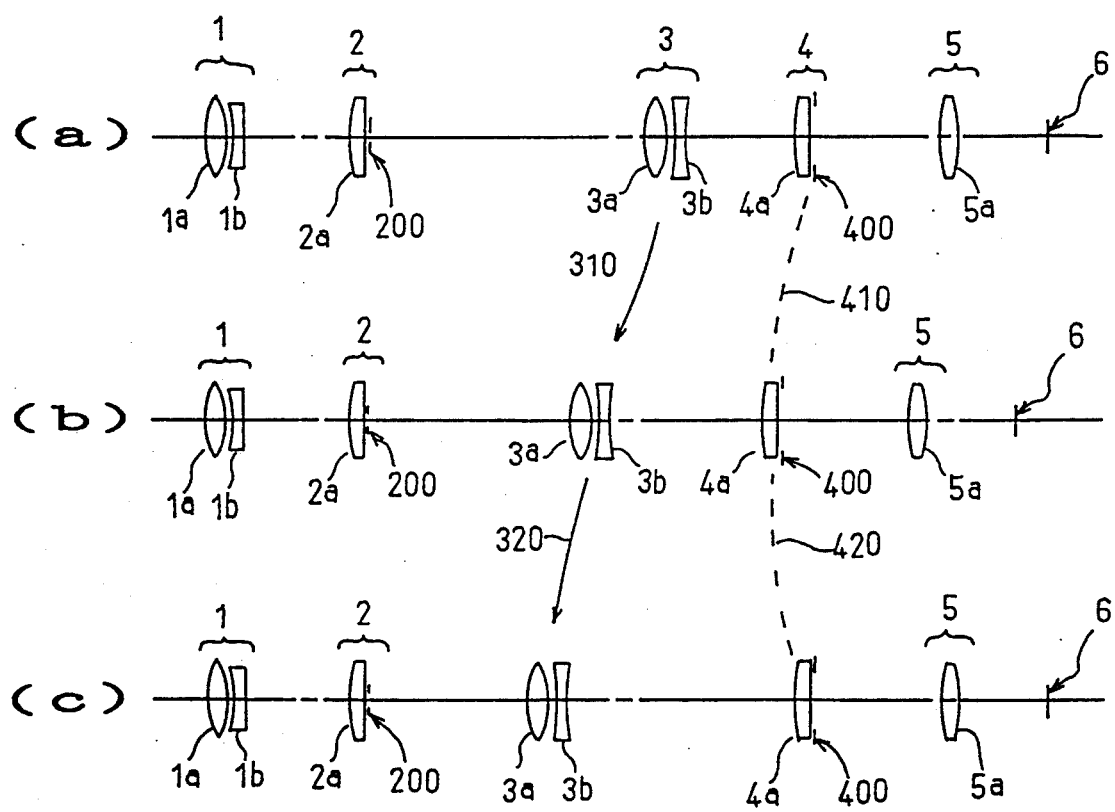
FIG. 21 is a cross sectional view of another embodiment of the present invention.

The remaining embodiments of the present invention will hereinafter be described with reference to the FIGS. 21 to 23. In FIG. 21, the finder optical system comprises, from the object side, an objective lens system 1, a first condenser lens 2, a relay lens system 3, a second condenser lens 4, and an ocular 5.

The objective lens system 1, which is stationary, has a positive lens element 1a and a negative lens element 1b. The objective lens system 1 forms a primary image (an inverted real image) on the pupil side of the first condenser lens 2. On the image plane of the primary image (the primary image plane) is provided a subject distance measuring frame 200. The relay lens system 3 is used as means for erecting the primary image. The relay lens system 3, which has a positive lens element 3a and a negative lens element 3b, moves at the optical zooming operation and the pseudo zooming operation. The relay lens system 3 forms a secondary image (an erected real image) on the pupil side of the second condenser lens 4. The second condenser lens 4 has a positive lens element 4a. On the image plane of the secondary image (the secondary image plane) is provided a field frame 400. The secondary image is viewed by the pupil 6 through the ocular 5.

When, in a camera, a taking lens system (not illustrated) is zoomed from the shortest focal length condition to the longest focal length condition, the driving force of the zooming is mechanically transmitted to the finder optical system in synchronization with the zooming operation, so that the relay lens system 3 moves along the arrow 310 from the position shown in (a) to the position shown in (b) in FIG. 21. According to this movement, the total length of the relay lens system 3 changes. That is, since the secondary image plane moves, the second condenser lens 4, the field frame 400, the ocular 5, and the pupil 6 simultaneously move along the dotted line 410 as the secondary image plane moves. In this embodiment, the optical zooming operation is performed by the movement of the relay lens system 3 from the position shown in (a) to the position shown in (b) in FIG. 21 (i.e. the optical zooming operation is performed simultaneously with the zooming of the taking lens system). Then, the pseudo zooming operation is performed by the movement of the relay lens system 3 from the position shown in (b) to the position shown in (c) in FIG. 21, along the arrow 320. The relay lens system 3 moves separately from the taking lens system. At this time, since the secondary image plane moves, the ocular 5 also moves along the dotted line 420. In such operation, the finder magnification is larger in the order of (a)→(b)→(c) in FIG. 21. The subject distance measuring frame 200, which is provided on the primary image plane behind the objective lens system 1, always shows the same area in a subject field without being effected by the zooming by the relay lens system 3. Therefore, in the finder of a camera having a function to measure a subject distance with light other than the light having passed through the taking lens system, a correct subject distance measuring frame 200 is shown. The size of the field frame 400, which is arranged on the secondary image plane, changes neither in the optical zooming operation nor in the pseudo zooming operation. Therefore, trimming area A (see FIG. 1a) is shown without using a variable field frame.

In the above embodiment shown in FIG. 21, the optical zooming operation is performed by the movement of the relay lens system 3 from the position shown in (a) to the position shown in (b) in FIG. 21, and the pseudo zooming operation is performed by the movement of the relay lens system 3 from the position shown in (b) to the position shown in (c) in FIG. 21. It is also possible that a pseudo zooming operation is performed by the movement of the relay lens system 3 from the position shown in (a) to the position shown in (b) in FIG. 21 which is separate from the movement of the taking lens system, and that the optical zooming operation is performed by the movement of the relay lens system 3 from the position shown in (b) to the position shown in (c) in FIG. 21 which is simultaneous with the zooming of the taking lens system.

The ratio of the movement amounts of the relay lens system 3 corresponding to the zooming amounts in the optical and the pseudo zooming operations, respectively, can be arbitrarily predetermined.

In the above-described embodiment, the optical zooming operation and the pseudo zooming operation are performed separately. However, the optical zooming operation and the pseudo zooming operation do not always have to be performed separately as far as a predetermined amount of zooming is obtained in the end.

Figure 22:
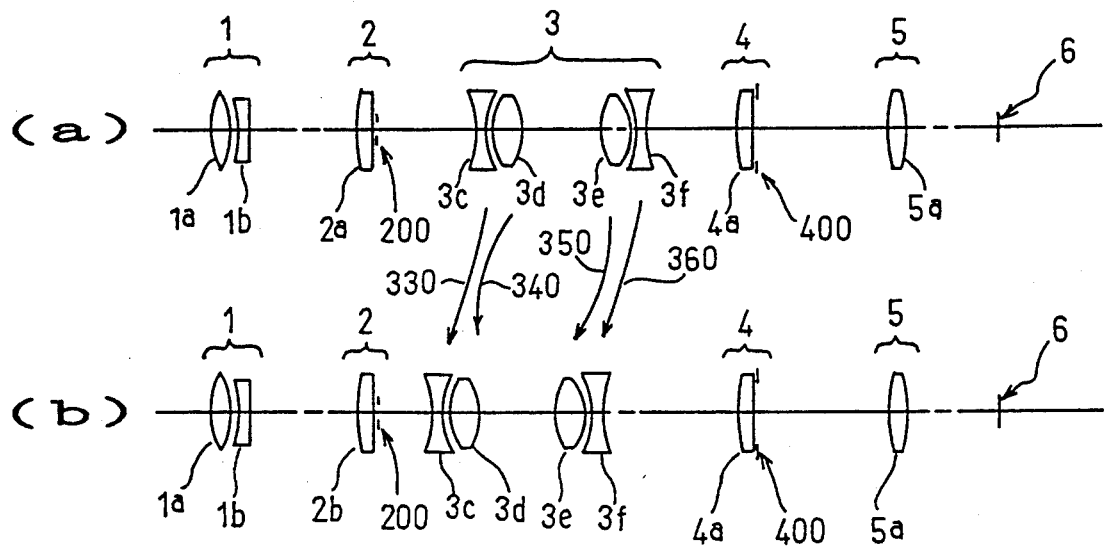
FIG. 22 is a cross sectional view of another embodiment of the present invention.

In the embodiment shown in FIG. 22, only the first, the second, the third, and the fourth lens elements 3c, 3d, 3e, and 3f of the relay lens system 3 move from the shortest focal length condition to the longest focal length condition along the arrows 330, 340, 350, and 360 at a zooming operation. The first and the fourth lens elements 3c and 3f move while maintaining a constant distance between them. As the four lens elements move, the distance between the first and the second lens elements 3c and 3d, and the distance between the third and the fourth lens elements 3e and 3f become shorter at first, and then they become longer.

The ratio of the movement amount of the relay lens system 3 corresponding to the amount of the optical and the pseudo zooming and the order of the optical zooming operation and the pseudo zooming operation in this embodiment are arbitrarily predetermined. In this embodiment, the second condenser lens 4 and the lenses arranged on the pupil side of the condenser lens 4 do not move, since the secondary image plane does not move as the relay lens system 3 moves. The finder magnification is larger in the order of (a)→(b) in FIG. 22.

Figure 23:
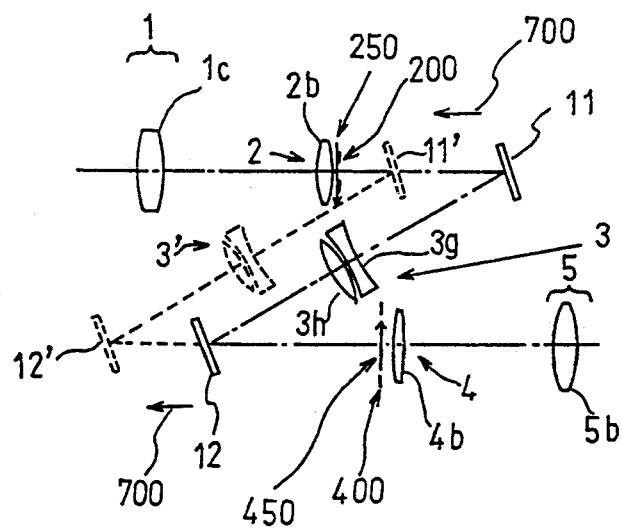
FIG. 23 is a cross sectional view of another embodiment of the present invention which is so constructed as to be applicable in a camera.

FIG. 23 shows an arrangement of the embodiment of the present invention which is suitable for being installed in a camera. In this embodiment, the optical system comprises, from the object side, an objective lens system 1 having a positive lens element 1c, a first condenser lens 2, a relay lens system 3 having a negative lens element 3g and a positive lens element 3h, a second condenser lens 4, and an ocular 5. In this embodiment, the first and second mirrors 11 and 12 are arranged between the first condenser lens 2 and the relay lens system 3, and between the relay lens system 3 and the second condenser lens 4, respectively to bend an optical path. Further, a subject distance measuring frame 200 is arranged on the image plane of the primary image formed on the pupil (not illustrated) side of the first condenser lens 2; a field frame 400 is arranged on the image plane of the secondary image formed on the subject side of the second condenser lens 4.

When the embodiments shown in FIGS. 22 and 23 are installed in a camera, respectively, it is preferable to z-shapedly bend the optical paths in the same manner as shown in FIG. 23 to realize a camera with a thin thickness size.

As shown in FIG. 23, a zooming operation is performed by the simultaneous movement of the relay lens system 3, the first mirror 11, and the second mirror 12 (the arrow 700). The dotted FIGS. 11' and 12' show the positions to which the first mirror 11 and the second mirror 12 move, respectively. A zooming operation is also performed by fixing the relay lens system 3, the first mirror 11, and the second mirror 12, and by moving the lenses such as the objective lens system 1, etc.

In the embodiment shown in FIG. 23, the angle formed by the optical axis of the light which enters the first mirror 11 and that of the light which leaves the first mirror 11 is an acute angle. The angle can be a right angle or an obtuse angle, if necessary. The angle formed by the optical axis of the light which enters the second mirror 12 and that of the light which leaves the second mirror 12 can also be a right angle or an obtuse angle.

Figure 24:
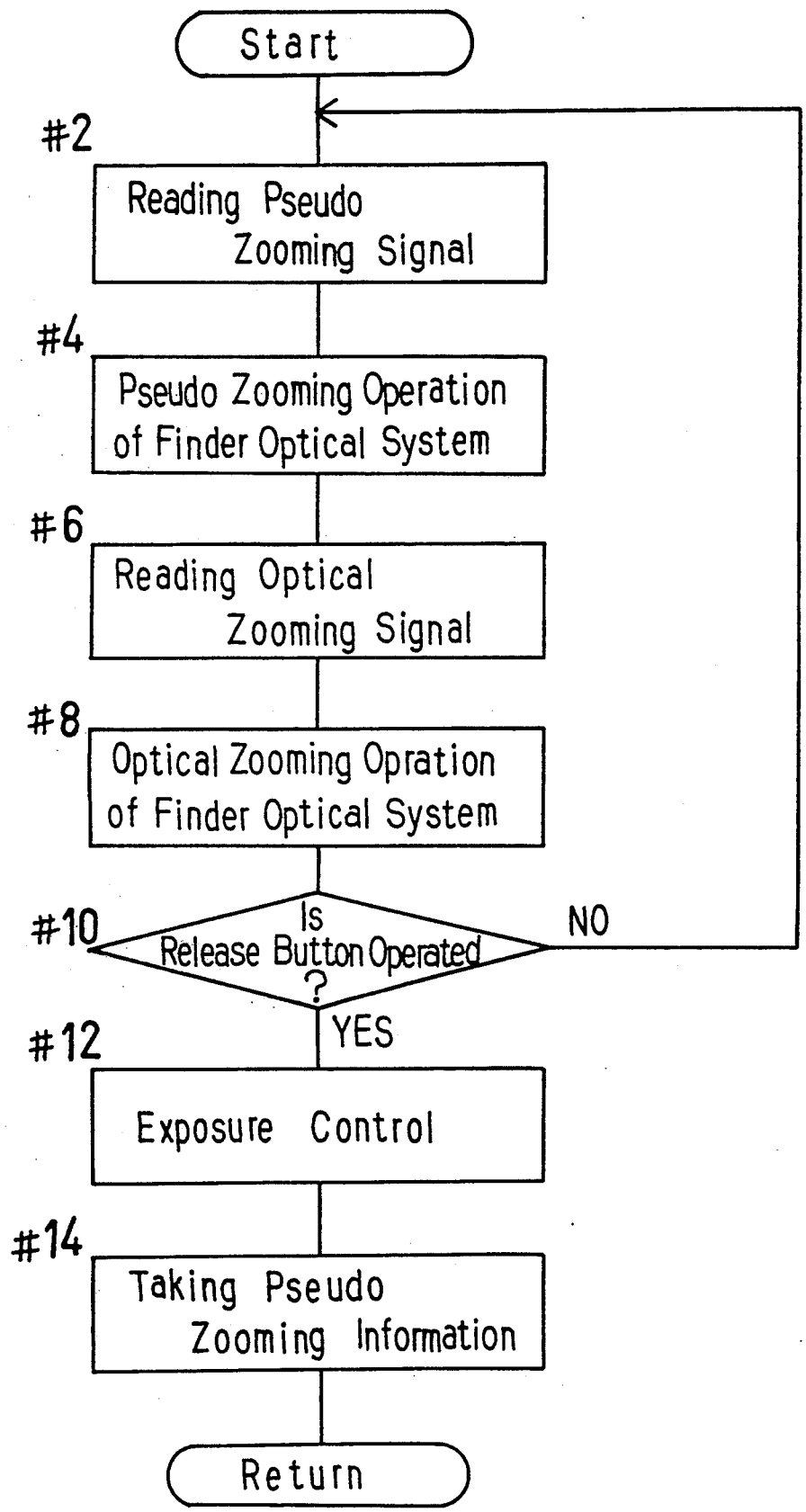
FIGS. 24 and 25 are flow charts of a camera for carrying out the zooming operation and the pseudo zooming operation.

Next, flow charts of a camera for carrying out the optical zooming operation and the pseudo zooming operation will be described with reference to FIGS. 24 and 25.

First, a pseudo zooming signal which has been set by a pseudo zooming setting button 130 (see FIG. 2) is read at step #2. Then, the zooming of the finder optical system is performed by the amount corresponding to the pseudo zooming signal (step #4). Next, the focal length of the taking lens system which has been set by a zoom lever 120 is read (step #6), and the zooming of the finder optical system is performed by the amount corresponding to the focal length (step #8). At this time, whether a release button 45 is operated or not is determined ar step #10. When the release button 45 is not operated, the operation returns to step #2. When the release button 45 is operated, the operation proceeds to step #12 and then to step #14, where the exposure is controlled (step #12) and the pseudo zooming information (trimming information) is taken on a film (step #14).

For a camera in which the pseudo zooming setting button 130 and the zoom lever 120 are separately provided as shown in FIG. 2, a finder optical system is suitable which is divided into a portion that performs only the pseudo zooming operation and a portion that performs only the optical zooming operation.

Figure 25:
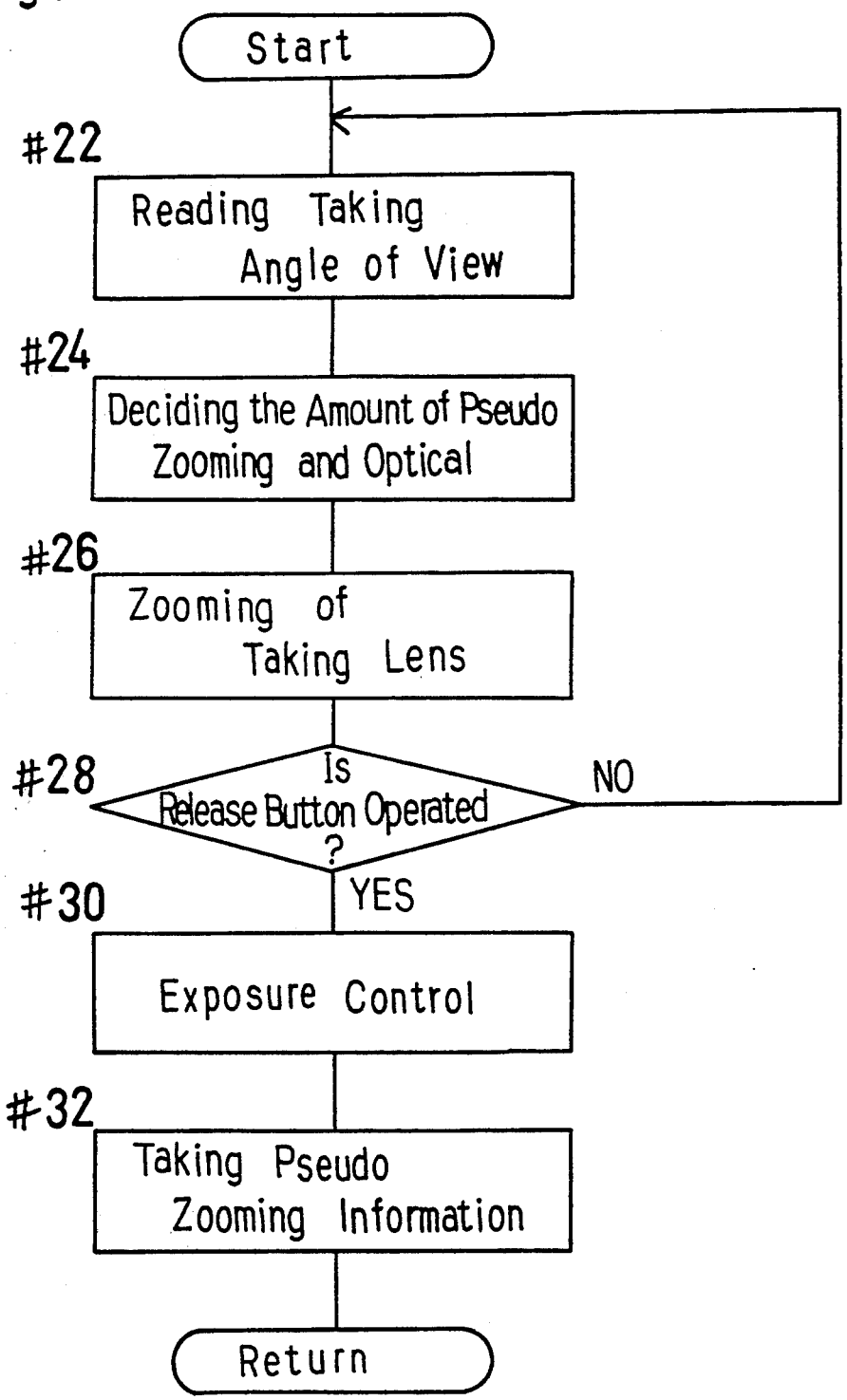
Figure 26:
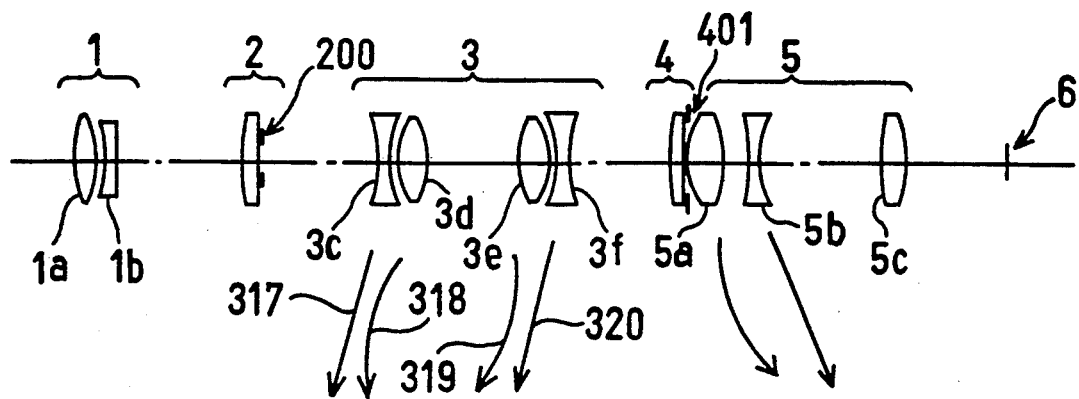
FIGS. 26 and 27 is a cross sectional view of a finder optical system of a camera in the flow charts of FIGS. 24 and 25.
Figure 27:
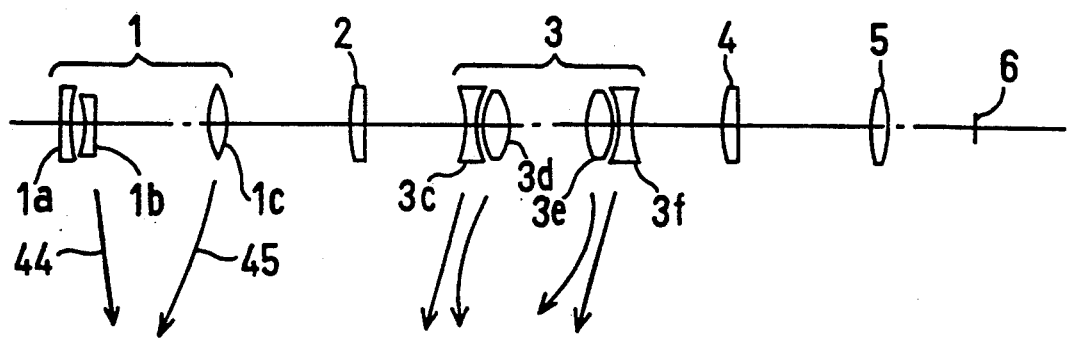

FIG. 25 shows a flow chart of a camera in which the taking angle of view is decided with the finder optical system and thereafter the amount of the optical zooming operation and the pseudo zooming operation is decided according to the taking angle of view. For such camera, the pseudo zooming setting button 130 is unnecessary; the taking angle of view may be determined with only the zoom lever 120. It is also unnecessary to divide the finder optical system into a portion which performs the pseudo zooming operation and a portion which performs the optical zooming operation. Such finder optical system is shown in FIGS. 26 and 27. FIG. 26 shows a finder optical system in which a taking angle of view is changed by the simultaneous movement of a relay lens system 3 and an ocular 5. FIG. 27 shows a finder optical system in which the taking angle of view is changed by the simultaneous movement of an objective lens system 1 and a relay lens system 3.

Next, the flow chart shown in FIG. 25 will be explained in detail. Since the optical systems as shown in FIGS. 26 and 27 are zoomed by operating the zoom lever 120, first, the taking angle of view of the finder optical system is detected from the zooming condition of the optical system (step #22), and then, the detected angle of view is divided into a portion for the pseudo zooming and a portion for the optical zooming (step #24). The ratio of each portion of the taking angle of view is predetermined, and is stored in a ROM (Read Only Memory), etc. Then, at step #26, the taking lens system is zoomed based on the amount of the optical zooming decided at step #24, and thereafter, whether the release button 45 is operated or not is determined. When the release button 45 is not operated, the operation returns to step #22. When the release button 45 is operated, the operation proceeds to step #30, where the exposure is controlled, and then, to #32, where the pseudo zooming information (trimming information) is taken on a film.

With a camera equipped with a finder optical system of such arrangement, a photographer can set a required taking angle of view by operating only the zoom lever 120 without being aware of the change of the kind of the zooming from the optical zooming to the pseudo zooming.

Obviously, many modifications and variations of the present invention are possible in light of the above teachings. It is therefore to be understood that within the scope of the appended claims, the invention may be practiced other than as specifically described.

What is claimed is:

1. A finder optical system provided separately from a taking lens system, comprising:
   an objective lens system for forming a primary image which is an inverted image of a subject;
   a relay lend system for erecting the primary image formed by the objective lens system to form a secondary image which is an erecting image of the subject, said relay lens system having a plurality of positions where the relay lens system forms different sizes of the secondary image from one another; and
   an ocular for enlargeing the secondary image formed by the relay len system, said ocular sequentially changing an enlargement ration by a sequentially movement of a lens unit of the ocular on an optical axis.

2. A finder optical system according to claim 1, which can be employed in a camera comprising a zoom lens as the taking lens system and having a pseudo zooming function, further including means for causing the relay lens system to change the size of the secondary image in response to a zooming of the taking lens system, and the ocular to change the enlargement ration of the secondary image in response to the pseudo zooming.

3. A finder optical system according to claim 1, which can be employed in a camera which detects an object distance by using light other than the light having passed through the taking lens system, wherein an object distance detection area display member is arranged adjacent to the primary image plane, and a field frame area display member is arranged adjacent to the secondary image plane.

4. A finder optical system provided separately from a taking lens system, comprising:
   an objective lens system for forming a primary image which is an inverted image of a subject, said object lens system having a plurality of focal lengths different from one another and not sequential; and
   a relay lens system for erecting the primary image formed by the objective lens system to form a secondary image which is an erecting image of the subject, said relay lens system changing a size of the secondary image by a sequentially movement of a lens unit of the relay lens system; and
   an ocular for enlarging the secondary image formed by the relay lens system.

5. A finder optical system according to claim 4, wherein a field frame display member is arranged adjacent to the secondary image plane.

6. A finder optical system according to claim 4, wherein the ocular moves along the same path, on which the secondary image moves, during the movement of the lens unit of the relay lens system.

7. A finder optical system provided separately from a taking lens system, comprising:
- an objective lens system for forming a primary image which is an inverted image of a subject, said objective lens system sequentially changing the size of the primary image by a movement of a lens unit of the object lens system;
- a relay lens system for erecting the primary image formed by the objective lens system to form a secondary image which is an erecting image of the subject, said relay lens system having a plurality of positions where the relay lens system forms different sizes of the secondary image from one another; and
- an ocular for enlarging the secondary image formed by the relay lens system.

8. A finder optical system according to claim 7, wherein a field frame display member is arranged adjacent to the secondary image plane.

9. A finder optical system provided separately from a taking lens system employed in a camera which includes a zoom lens as a taking lens system and a pseudo zooming function, comprising:
- an objective lens system for forming a primary image which is an inverted image of a subject;
- a relay lens system for erecting the primary image formed by the objective lens system to form a secondary image which is an erecting image and for changing the size of the secondary image in response to a zooming and a pseudo zooming of the taking lens system; and
- an ocular for enlarging the secondary image formed by the relay lens system.

10. A finder optical system according to claim 9, wherein the camera can detect an object distance by using light other than the light having transmitted through the taking lens system, and wherein an object distance detection area display member is arranged adjacent to the primary image plane and a field frame display member is arranged adjacent to the secondary image plane.

11. A finder optical system according to claim 9, wherein the ocular moves along the same path, on which the secondary image moves, during the movement of the lens unit of the relay lens system.

12. A finder optical system provided separately from a taking lens system, comprising:
- an objective lens system for forming a primary image, which is an inverted image of a subject, on a primary image plane fixed on a predetermined position of an optical axis and for sequentially changing a size of the primary image by a movement of a lens unit of the objective lens system;
- a relay lens system for erecting the primary image formed by the objective lens system to form a secondary image which is an erecting image of the subject and for sequentially changing a size of the secondary image by a movement of a lens; and
- an ocular for enlarging the secondary image formed by the relay lens system.

13. A finder optical system provided separately from a taking lens system, comprising:
- an objective lens system for forming a primary image which is an inverted image of a subject;
- a relay lens system for erecting the primary image formed by the objective lens system to form a secondary image which is an erecting image of the subject, said relay lens system changing a size of the secondary image by a sequential movement of a lens unit of the relay lens system; and
- an ocular for enlarging the secondary image formed by the relay lens system, said ocular sequentially changing an enlargement ration by a sequential movement of a lens unit of the ocular on an optical axis.

14. A finder optical system according to claim 13, wherein the movable lens units of the relay lens system and the ocular move on an optical axis simultaneously.

15. A finder optical system according to claim 13, wherein the ocular moves along the same path, on which the secondary image moves, during the movement of the lens unit of the relay lens system.

16. A variable field frame finder optical system for providing an image for use with a pseudo focal length objective lens system in a camera, comprising:
- an objective lens unit for forming a primary inverted image in the view finder optical system;
- a relay lens unit for erecting the primary image to an erect secondary image, the relay lens unit being movable to provide a zooming mode of operating for changing a size of the secondary image while the objective lens unit remains stationary;
- an ocular lens unit for enlarging the secondary image during a pseudo zooming operation;
- means for providing a variable field frame in the view finder optical system; and
- means for recording the variable field frame relative to a photographic taking operation.

17. A variable field frame view finder optical system for providing an image for use with a pseudo focal length objective lens system in a camera, comprising:
- a fixed position objective lens unit for forming a primary inverted image in the view finder optical system;
- a relay lens unit for erecting the primary image to an erect secondary image;
- an ocular lens unit for providing a zoom mode of operation while the relay lens unit and objective lens unit remain stationary, the relay lens unit being movable to a second position to enable a pseudo zooming operation by further movement of the ocular lens unit;
- means for providing a variable field frame in the view finder optical system; and
- means for recording the variable field frame relative to a photographic taking operation.

* * * * *